United States Patent
Nikitin et al.

(10) Patent No.: US 9,928,721 B2
(45) Date of Patent: Mar. 27, 2018

(54) SYSTEMS, METHODS, AND APPARATUS TO PERMIT COMMUNICATION BETWEEN PASSIVE WIRELESS TRANSPONDERS

(71) Applicant: Intermec IP Corp., Everett, WA (US)

(72) Inventors: Pavel Nikitin, Seattle, WA (US); Stephen J. Kelly, Marion, IA (US)

(73) Assignee: INTERMEC IP CORP., Lynnwood, WA (US)

( * ) Notice: Subject to any disclaimer, the term of this patent is extended or adjusted under 35 U.S.C. 154(b) by 1042 days.

(21) Appl. No.: 14/035,525

(22) Filed: Sep. 24, 2013

(65) Prior Publication Data

US 2015/0084771 A1 Mar. 26, 2015

(51) Int. Cl.
| | |
|---|---|
| *G08B 21/18* | (2006.01) |
| *G06K 7/00* | (2006.01) |
| *G06K 19/073* | (2006.01) |
| *G06K 7/10* | (2006.01) |
| *G01S 13/75* | (2006.01) |

(52) U.S. Cl.
CPC ........... *G08B 21/18* (2013.01); *G06K 7/0008* (2013.01); *G06K 7/10237* (2013.01); *G06K 19/07372* (2013.01); *G01S 13/751* (2013.01)

(58) Field of Classification Search
CPC ......... G06K 19/07372; G06K 7/10237; G06K 7/0008; G08B 21/18; G01S 13/751
See application file for complete search history.

(56) References Cited

U.S. PATENT DOCUMENTS

| | | | |
|---|---|---|---|
| 6,668,216 B2 | 12/2003 | Mays | |
| 7,377,447 B2 | 5/2008 | Oberle | |
| 8,199,689 B2 | 6/2012 | Maltseff et al. | |
| 2004/0027240 A1* | 2/2004 | Greeff | G01S 13/751 340/10.3 |
| 2007/0115125 A1* | 5/2007 | Lyon | G06K 7/0008 340/572.1 |

(Continued)

FOREIGN PATENT DOCUMENTS

WO 2007/035863 A2 3/2007

OTHER PUBLICATIONS

Jun. 8, 2016 Search Report issued in European Patent Application No. 16165651.7.

(Continued)

*Primary Examiner* — Mohamed Barakat

(74) *Attorney, Agent, or Firm* — Oliff PLC; R. Brian Drozd

(57) ABSTRACT

Passive wireless transponders can perform transponder-to-transponder communication when illuminated by an interrogation carrier wave. The transponder-to-transponder communication permits each transponder to determine the identity of "other" proximately transponders. The transponder-to-transponder communication optionally permits each transponder to identify a "nearest neighbor" using one or more backscatter signal properties such as received signal strength or time-of-flight. Using this information and one or more externally supplied or internally stored instruction sets transponders can provide neighboring transponder data to an interrogator. Using this "neighbor" data, the interrogator can provide a system user with data indicative of the relative locations of a plurality of tags arranged in a one or two dimensional matrix.

30 Claims, 6 Drawing Sheets

(56) References Cited

U.S. PATENT DOCUMENTS

| | | | |
|---|---|---|---|
| 2008/0099557 A1* | 5/2008 | James | G06Q 10/087 235/385 |
| 2008/0252424 A1* | 10/2008 | Maltseff | G06K 7/10237 340/10.1 |
| 2010/0326145 A1 | 12/2010 | Powers et al. | |
| 2012/0126945 A1 | 5/2012 | Kim et al. | |
| 2012/0139711 A1* | 6/2012 | Nikitin | G06K 7/10118 340/10.4 |

OTHER PUBLICATIONS

Jun. 12, 2015 Extended Search Report issued in European Application No. 14183999.3.

* cited by examiner

SYSTEMS, METHODS, AND APPARATUS TO PERMIT COMMUNICATION BETWEEN PASSIVE WIRELESS TRANSPONDERS

BACKGROUND

Technical Field

The present disclosure generally relates to the field of passive wireless transponders, more specifically to communication between passive wireless transponders in the presence of an externally applied carrier wave.

Description of the Related Art

Passive wireless transponders such as radio frequency identification tags typically include an antenna, a control circuit or controller, and a limited quantity of nontransitory storage. Typically, each passive wireless transponder includes data indicative of a unique identifier hardwired or stored in the nontransitory storage (e.g., nonvolatile memory). Additionally, logic or machine executable instruction sets executable by the control circuit or controller may be optionally hardwired or stored in the nontransitory storage. Passive wireless transponders receive energy when illuminated or interrogated by a carrier wave within a particular frequency range. When energized, passive wireless transducers may backscatter waves which may or may not carry data. Additionally, the passive wireless transponders may execute one or more sets of machine executable instructions when energized. Such machine executable instructions permit passive wireless transponders to perform additional functions such as transmitting stored data, writing to nontransitory storage or interacting with the ambient environment.

Typically, a reader or interrogator transmits a carrier wave to energize the passive wireless transponders. The reader and interrogator also typically receives backscatter signals from the energize passive wireless transponders. The reader may decode or interpret information encoded or imposed on the backscatter signals. Sometimes one or more readers or interrogators are communicably coupled to a host or back-end processor-based system. The interrogator extracts the data carried by the backscatter waves produced by each passive wireless device within range of the interrogator. Using the extracted data, the interrogator is able to perform various functions including information lookup (e.g., determining the type and price of an item to which the passive wireless transponder is attached) and position determination (e.g., indicating an approximate direction and distance to a particular passive wireless transponder).

BRIEF SUMMARY

Each of a plurality of grouped or otherwise accumulated passive wireless transponders can be configured to communicate with at least one other passive wireless transponder when exposed to an incoming radio frequency signal such as an interrogation carrier wave. In some instances, one or more signal parameters (e.g., signal strength, time-of-flight) of the backscatter signals produced by each of the plurality of passive wireless transponders can be used to deduce the physical or spatial relationship of one transducer to one or more other transducers. For example, the signal parameters of the backscatter signals may be used to deduce which transducers are positioned proximate a particular transponder. Additionally, through the use of transponder-to-transponder communications achieved via backscatter waves, each transponder is able to provide data indicative of other transponders that are positioned proximate the transponder providing the backscatter signal.

The ability to determine the relative physical relationship between passive wireless transducers opens a new realm of possibilities for use of such transponders in commercial, security, and packaging applications. In one example implementation, a number of frangible, passive, wireless transponders may be embedded or otherwise incorporated into a substrate such as paper or polymeric tape used to seal packages for shipment. In another example, the physical displacement of the passive wireless transponders that occurs with removal or disruption of the substrate may result in an inability for the tags to communicate with one another via backscatter waves. The frangible transponders are positioned in the substrate at a distance permitting neighboring transponders to "communicate" when illuminated by an interrogator carrier wave. In at least some instances, the interrogator carrier wave may include one or more commands that are backscatter communicated by each transponder to a neighboring transponder. In some instances, such transmission of the command between neighboring transponders occurs until the originating transponder is reached to provide an indication of substrate continuity. In other instances, such transmission of the command between neighboring transponders occurs until a defined endpoint is reached (i.e., from a transponder positioned at the first end of the substrate to a transponder positioned at the second end of the substrate). Advantageously, once attached to a package or similar enclosure, any attempt to remove the substrate from the package will result in the destruction of one or more frangible transponders. Destruction of a transponder will interrupt the backscatter communication between neighboring tags, thereby providing an indication of substrate discontinuity that may signal tampering with the package has occurred.

In another example, each item included in a collection of ordered items (e.g., library books, archive records) may include a passive wireless transponder. Data indicative of the identity of each transponder's neighbor(s) is stored within a nontransitory storage coupled to each respective transponder. Upon receipt of an interrogation carrier wave, each transponder can backscatter communicate with neighboring transponders to ascertain their identity. Improperly filed items, detected when transponders are unable to verify the identity of their neighboring transponders, are advantageously located and data indicative of the improperly positioned items communicated to a device such as an RFID interrogator.

In yet another example, each item in a two-dimensional matrix (e.g., shoeboxes on a store shelf) may include a passive wireless transponder. Upon receipt of an interrogation carrier wave, each transponder can backscatter communicate with neighboring transponders to ascertain their identity. The identity of each transponder, along with the identities of neighboring transponders detected via backscatter communication is transmitted to an external device such as an RFID interrogator or a backend or host processor-based system. In at least some instances, the external device can compile a map showing the relative location of each transponder with respect to other transponders.

A method to determine the relative positions of a number of passive wireless transponders may be summarized as including receiving information from each of a plurality of passive wireless transponders, the information received from each of the passive wireless transponders identifying at least one neighboring passive wireless transponder that is spatially proximate the respective passive wireless transponder from which the information is received; and determining a relative position of the passive wireless transponders with respect to one another based at least in part on the information received from the passive wireless transponders.

Receiving information may include receiving information by an interrogator system, and may further include providing an interrogation carrier wave to the plurality of passive wireless transponders which causes at least some of the plurality of passive wireless devices to communicate with one another. Determining a relative position of the passive wireless transponders with respect to one another based at least in part on the information received from the passive wireless transponders may include determining the relative position of the passive wireless transponders with respect to one another by a host processor-based system, the host processor-based system remotely located with respect to the interrogator system. Determining a relative position of the passive wireless transponders with respect to one another based at least in part on the information received from the passive wireless transponders may include determining the relative position of the passive wireless transponders with respect to one another by the interrogator system. Determining a relative position of the passive wireless transponders with respect to one another based at least in part on the information received from the passive wireless transponders may include\ determining the relative position of the passive wireless transponders with respect to one another by at least one of the passive wireless transponders. Providing an interrogation carrier wave may include providing by the interrogator system an interrogation carrier wave having a signal including data modulated thereon. Providing by the interrogator system an interrogation carrier wave having a signal including data modulated thereon may include providing by the interrogator system an interrogation carrier wave having a signal modulated thereon, the signal including data representative of at least one command.

The plurality of wireless transponders may be located about an enclosure and may further include determining based on the received information whether tampering with the enclosure has occurred; and causing an indication of tampering to be provided in response to a determination that tampering with the enclosure has occurred.

The plurality of wireless transponders may be located about packaging, and may further include determining based on the received information whether tampering with the packaging has occurred; and causing an indication of tampering to be provided in response to a determination that that tampering with the packaging has occurred.

The plurality of wireless transponders may be located across at least one flap of a packaging and may further include determining based on the received information whether tampering with the packaging has occurred; and causing an indication of tampering to be provided in response to a determination that that tampering with the packaging has occurred.

The method may further include determining if any of the passive wireless transponders are out of order with respect to in a defined array. Determining a relative position of the passive wireless transponders with respect to one another based at least in part on the information received from the passive wireless transponders may include generating a virtual map of the plurality of passive wireless transponders, the virtual map which represents relative spatial positions of the passive wireless transponders with respect to one another.

An interrogator system to determine the relative positions of a plurality of passive wireless transponders may be summarized as including a transceiver to provide an interrogation carrier wave; a processor communicably coupled to the transceiver; and a processor-readable nontransitory storage medium including machine executable instructions that when executed by the processor, cause the processor to: receive information from each of a plurality of passive wireless transponders that identifies at least one neighboring passive wireless transponder that is spatially proximate the respective passive wireless transponder from which the information is received; and determine a relative position of the passive wireless transponders with respect to one another based at least in part on the information received from the passive wireless transponders.

The machine executable instructions that cause the processor to receive information from each of a plurality of passive wireless transponders may further cause the processor to: receive information from each of a plurality of passive wireless transponders located about an enclosure; determine based on the received information whether tampering with the enclosure has occurred; and responsive to a determination that tampering with the enclosure has occurred, generate a human perceptible output indicative that tampering with the enclosure has occurred.

The machine executable instructions that cause the processor to receive information from each of a plurality of passive wireless transponders may further cause the processor to: receive information from each of a plurality of passive wireless transponders located about an package; determine based on the received information whether tampering with the package has occurred; and responsive to a determination that tampering with the package has occurred, generate a human perceptible output indicative that tampering with the package has occurred.

The machine executable instructions that cause the processor to receive information from each of a plurality of passive wireless transponders may further cause the processor to: receive information from each of a plurality of passive wireless transponders located across at least one packaging flap; determine based on the received information whether tampering with the package has occurred; and responsive to a determination that tampering with the package has occurred, generate a human perceptible output indicative that tampering with the package has occurred.

The machine executable instructions may further cause the processor to: compare information received information from each of a plurality of passive wireless transponders with stored data indicative of a defined array; and determine whether any of the passive wireless transponders are out of order with respect to the defined array.

The machine executable instructions may further cause the processor to: generate a virtual map of the plurality of passive wireless transponders, the virtual map representative of the relative spatial positions of the passive wireless transponders with respect to each other.

A method of operation of a passive wireless transponder may be summarized as including in response to receipt of an interrogation carrier wave, receiving information from each of a number of other passive wireless transponders by the passive wireless transponder; and transmitting information identifying at least one of the other passive wireless transponders as a neighboring passive wireless transponder that is spatially proximate the passive wireless transponder from which the information is received.

The method may further include categorizing at least one of the other passive wireless transponders as a neighboring passive wireless transponder. Categorizing at least one of the other passive wireless transponders as a neighboring passive wireless transponder may include categorizing at least one of the other passive wireless transponders as a neighboring passive wireless transponder based at least in part on a signal strength of a signal received by the passive wireless transponder from one of the other passive wireless transponders. Categorizing at least one of the other passive wireless transponders as a neighboring passive wireless transponder may include categorizing at least one of the other passive wireless transponders as a neighboring passive wireless transponder based at least in part on a signal strength of a signal received by the passive wireless transponder from one of the other passive wireless transponders relative to a signal strength of a signal received by the passive wireless transponder from other ones of the other passive wireless transponders. Categorizing at least one of the other passive wireless transponders as a neighboring passive wireless transponder may include categorizing at least one of the other passive wireless transponders as a neighboring passive wireless transponder based at least in part on a time-of-flight of a signal received by the passive wireless transponder from one of the other passive wireless transponders. Categorizing at least one of the other passive wireless transponders as a neighboring passive wireless transponder may include categorizing at least one of the other passive wireless transponders as a neighboring passive wireless transponder based at least in part on a time-of-flight of a signal received by the passive wireless transponder from one of the other passive wireless transponders relative to a time-of-flight of a signal received by the passive wireless transponder from other ones of the other passive wireless transponders. Transmitting information identifying at least one of the other passive wireless transponders as a neighboring passive wireless transponder may include backscattering an interrogation carrier wave received from an interrogator system with the information encoded in the backscattered signal.

A passive wireless transponder may be summarized as including an antenna; a controller communicably coupled to the antenna; and a nontransitory storage media communicably coupled to the controller including machine-executable instructions that cause the controller to: receive information from each of a number of other passive wireless transponders responsive to the receipt of an interrogation carrier wave by the antenna; and transmit information that identifies at least one of the other passive wireless transponders as a spatially proximate, neighboring, passive wireless transponder.

The machine-executable instructions that may cause the controller to transmit information that identifies at least one of the other passive wireless transponders as a spatially proximate, neighboring, passive wireless transponder may further cause the controller to: identify at least one of the other passive wireless transponders as a spatially proximate, neighboring, passive wireless transponder based on a received signal strength representative of a signal received from each of the other passive wireless transponders; and transmit information that identifies at least one of the other passive wireless transponders as a spatially proximate, neighboring, passive wireless transponder.

The machine-executable instructions that may cause the controller to transmit information that identifies at least one of the other passive wireless transponders as a spatially proximate, neighboring, passive wireless transponder may further cause the controller to: compare a signal strength representative of a signal received from one of the other passive wireless transponders with signal strengths of signals received from other ones of the other passive wireless transponders; identify at least one of the other passive wireless transponders as a spatially proximate, neighboring, passive wireless transponder based on the compared signal strengths; and transmit information that identifies at least one of the other passive wireless transponders as a spatially proximate, neighboring, passive wireless transponder.

The machine-executable instructions that may cause the controller to transmit information that identifies at least one of the other passive wireless transponders as a spatially proximate, neighboring, passive wireless transponder may further cause the controller to: identify at least one of the other passive wireless transponders as a spatially proximate, neighboring, passive wireless transponder based on a time-of-flight parameter of a signal received from each of the other passive wireless transponders; and transmit information that identifies at least one of the other passive wireless transponders as a spatially proximate, neighboring, passive wireless transponder.

The machine-executable instructions that may cause the controller to transmit information that identifies at least one of the other passive wireless transponders as a spatially proximate, neighboring, passive wireless transponder may further cause the controller to: compare a time-of-flight parameter of a signal received from one of the other passive wireless transponders with time-of-flight parameters of signals received from other ones of the other passive wireless transponders; identify at least one of the other passive wireless transponders as a spatially proximate, neighboring, passive wireless transponder based on the compared times-of-flight; and transmit information that identifies at least one of the other passive wireless transponders as a spatially proximate, neighboring, passive wireless transponder.

A method of operation may be summarized as including providing an interrogation carrier wave to the plurality of passive wireless transponders, the interrogation carrier wave which causes the passive wireless transponders to transmit to a neighboring passive wireless transponder in a defined order; receiving information from at least one of the plurality of passive wireless transponders, the information received from the at least one of the plurality of passive wireless transponders indicative of whether each of the passive wireless transponders have successfully transmitted to a respective neighboring passive wireless transponder in the defined order; and determining based on the received information whether each of the passive wireless transponders have successfully transmitted to a respective neighboring passive wireless transponder in the defined order. Providing an interrogation carrier wave to the plurality of passive wireless transponders may include providing an interrogation carrier wave which causes the passive wireless transponders to successively pass a command along a defined sequence of the passive wireless transponders. Providing an interrogation carrier wave to the plurality of passive wireless transponders may include providing an interrogation carrier wave which causes the passive wireless transponders to successively pass a command along a defined sequence of the passive wireless transponders in a closed loop starting from and ending with a first one of the passive wireless transponders. Providing an interrogation carrier wave to the plurality of passive wireless transponders may include providing an interrogation carrier wave which causes the passive wireless transponders to successively pass a command along a defined sequence of the passive wireless transponders in a first direction from a first one to a last one of the passive wireless transponders in the defined sequence. Providing an interrogation carrier wave to the plurality of passive wireless transponders may include providing an interrogation carrier wave signal which causes the passive wireless transponders to successively pass a command along a defined sequence of the passive wireless transponders in a first direction from a first one to a last one of the passive wireless transponders in a first defined sequence and then in a second direction from the last one to the first one of the passive wireless transponders in a second defined sequence. Providing an interrogation carrier wave to the plurality of passive wireless transponders may includes providing an interrogation carrier wave which causes the passive wireless transponders to successively pass information along a defined sequence of the passive wireless transponders. Providing an interrogation carrier wave to the plurality of passive wireless transponders may include providing an interrogation carrier wave which causes the passive wireless transponders to successively pass information along a defined sequence of the passive wireless transponders in a closed loop starting from and ending with a first one of the passive transponders. Providing an interrogation carrier wave to the plurality of passive wireless transponders may include providing an interrogation carrier wave which causes the passive wireless transponders to successively pass information along a defined sequence of the passive wireless transponders in a first direction from a first one to a last one of the passive wireless transponders in the defined sequence. Providing an interrogation carrier wave to the plurality of passive wireless transponders may include providing an interrogation carrier wave which causes the passive wireless transponders to successively pass information along a defined sequence of the passive wireless transponders in a first direction from a first one to a last one of the passive wireless transponders in a first defined sequence and then in a second direction from the last one to the first one of the passive wireless transponders in a second defined sequence. The interrogation carrier wave may causes the passive wireless transponders to each retrieve from a memory of the passive wireless transponder a unique identifier for at least one respective neighboring passive wireless transponder.

The plurality of wireless transponders may be located about an enclosure and may further include determining based on the received information whether tampering with the enclosure has occurred; and causing an indication of tampering to be provided in response to a determination that tampering with the enclosure has occurred.

The plurality of wireless transponders may be located about packaging and may further include determining based on the received information whether tampering with the packaging has occurred; and causing an indication of tampering to be provided in response to a determination that tampering with the packaging has occurred.

The plurality of wireless transponders may be located across at least one flap of a packaging and may further include determining based on the received information whether tampering with the packaging has occurred; and causing an indication of tampering to be provided in response to a determination that tampering with the packaging has occurred.

An interrogator system to determine the relative positions of a plurality of passive wireless transponders may be summarized as including a transceiver to provide an interrogation carrier wave; a processor communicably coupled to the transceiver; and a processor-readable nontransitory storage medium including machine executable instructions that when executed by the processor, cause the processor to: transmit an interrogation carrier wave to each of a plurality of passive wireless transponders that causes each of the plurality of wireless transponders to transmit a backscatter signal to a neighboring passive wireless transponder in a defined order; receive information from at least one of the plurality of passive wireless transponders, the information received from the at least one of the plurality of passive wireless transponders indicative of whether each of the passive wireless transponders have successfully transmitted to a respective neighboring passive wireless transponder in the defined order; and determine based on the received information whether each of the passive wireless transponders have successfully transmitted to a respective neighboring passive wireless transponder in the defined order.

The machine-executable instructions that may cause the processor to transmit an interrogation carrier wave to each of a plurality of passive wireless transponders may further cause the processor to: transmit an interrogation carrier wave to each of a plurality of passive wireless transponders that causes each of the plurality of wireless transponders to successively transmit a command using a backscatter signal to a defined sequence of passive wireless transponders.

The machine-executable instructions that may cause the processor to transmit an interrogation carrier wave to each of a plurality of passive wireless transponders may further cause the processor to: transmit an interrogation carrier wave to each of a plurality of passive wireless transponders that causes each of the plurality of wireless transponders to successively transmit a command using a backscatter signal to a defined sequence of passive wireless transponders in a closed loop, starting and ending with a first one of the passive wireless transponders.

The machine-executable instructions that may cause the processor to transmit an interrogation carrier wave to each of a plurality of passive wireless transponders may further cause the processor to: transmit an interrogation carrier wave to each of a plurality of passive wireless transponders that causes each of the plurality of wireless transponders to successively transmit a command using a backscatter signal to a defined sequence of passive wireless transponders in a first direction from a first one to a last one of the passive wireless transponders in a defined sequence.

The machine-executable instructions that may cause the processor to transmit an interrogation carrier wave to each of a plurality of passive wireless transponders may further cause the processor to: transmit an interrogation carrier wave to each of a plurality of passive wireless transponders that causes each of the plurality of wireless transponders to successively transmit a command using a backscatter signal to a defined sequence of passive wireless transponders in a first direction from a first one to a last one of the passive wireless transponders in a first defined sequence and then in a second direction from the last one to the first one of the passive wireless transponders in a second defined sequence.

The machine executable instructions that may cause the processor to receive information from each of a plurality of passive wireless transponders further cause the processor to: receive information from each of a plurality of passive wireless transponders located about an enclosure; determine based on the received information whether tampering with the enclosure has occurred; and responsive to a determination that tampering with the enclosure has occurred, generate a human perceptible output indicative that tampering with the enclosure has occurred.

The machine executable instructions that may cause the processor to receive information from each of a plurality of passive wireless transponders further cause the processor to: receive information from each of a plurality of passive wireless transponders located across at least one packaging flap; determine based on the received information whether tampering with the package has occurred; and responsive to a determination that tampering with the package has occurred, generate a human perceptible output indicative that tampering with the package has occurred.

A method of operation of a first passive wireless transponder may be summarized as including receiving an interrogation carrier wave by the first passive wireless transponder; in response to receipt of the interrogation carrier wave, transmitting a first signal by the first passive wireless transponder to at least one neighboring passive wireless transponder; and receiving a second signal from at least one neighboring passive wireless transponder by the first passive wireless transponder, the received second signal indicative of whether each of a plurality of passive wireless transponders, which includes at least the first and at least the neighboring passive wireless transponders, have successfully transmitted to one another in a defined order.

The method may further include determining whether each of the passive wireless transponders have successfully transmitted to a respective neighboring passive wireless transponder in the defined order based on the received second signal.

The method may further include determining by at least one circuit of the first passive wireless transponder whether each of the passive wireless transponders have successfully transmitted to a respective neighboring passive wireless transponder in the defined order based at least in part on the received second signal.

The method may further include transmitting information to an interrogation system by the first passive wireless transponder, the information indicative of whether each of the plurality of passive wireless transponders have successfully transmitted to one another in a defined order. Transmitting a first signal by the first passive wireless transponder may include transmitting a first signal which includes at least one unique identifier that uniquely identifies a respective neighboring passive wireless transponder. Transmitting a first signal by the first passive wireless transponder may include transmitting a first signal which omits any unique identifiers that uniquely identify any neighboring passive wireless transponders. Transmitting a first signal by the first passive wireless transponder may include transmitting a first signal which includes a unique identifier that uniquely identifies the first passive wireless transponder.

A passive wireless transponder may be summarized as including an antenna; a controller communicably coupled to the antenna; and a nontransitory storage media communicably coupled to the controller including machine-executable instructions that cause the controller to: transmit a first signal to at least one neighboring passive wireless transponder responsive to receipt of an interrogation carrier wave by the antenna; and receive a second signal from at least one neighboring passive wireless transponder, the received second signal indicative of whether each of a plurality of passive wireless transponders have successfully transmitted a defined signal to one another in a defined order.

The machine-executable instructions may further cause the controller to: determine whether each of the passive wireless transponders have successfully transmitted to a respective neighboring passive wireless transponder in the defined order based on the received second signal.

The machine-executable instructions may further cause the controller to: transmit a signal to an interrogation system, the signal including indicative of whether each of the plurality of passive wireless transponders have successfully transmitted to one another in a defined order.

The machine-executable instructions that may cause the controller to transmit a first signal to at least one neighboring passive wireless transponder responsive to receipt of an interrogation carrier wave by the antenna may further cause the controller to: transmit a first signal which includes at least one unique identifier that uniquely identifies a respective neighboring passive wireless transponder.

The machine-executable instructions that may cause the controller to transmit a first signal to at least one neighboring passive wireless transponder responsive to receipt of an interrogation carrier wave by the antenna may further cause the controller to: transmit a first signal which omits any unique identifiers that uniquely identify any neighboring passive wireless transponders.

The machine-executable instructions that may cause the controller to transmit a first signal to at least one neighboring passive wireless transponder responsive to receipt of an interrogation carrier wave by the antenna may further cause the controller to: transmit a first signal which includes a unique identifier that uniquely identifies the passive wireless transponder.

A method of operation may be summarized as including repeatedly providing an interrogation carrier wave to the plurality of passive wireless transponders, the interrogation carrier wave which causes the passive wireless transponders to transmit to at least one neighboring passive wireless transponder; receiving information from at least one of the plurality of passive wireless transponders, the received information indicative of whether each of the passive wireless transponders have successfully transmitted to at least one respective neighboring passive wireless transponder in response to each interrogation carrier wave; and determining whether each of the passive wireless transponders have successfully transmitted to at least one respective neighboring passive wireless transponder in response to each interrogation carrier wave. The passive wireless transponders may be grouped in pairs, each passive wireless transponder of a respective one of the pairs opposed to one another across an edge of a selectively openable passage, and receiving information from at least one of the plurality of passive wireless transponders, the received information indicative of whether each of the passive wireless transponders have successfully transmitted to at least one respective neighboring passive wireless transponder in response to each interrogation signal includes receiving information form at least one passive wireless transponder of each pair, the received information indicative of whether the passive wireless transponders of the respective pair successively communicated with one another. The passive wireless transponders may be grouped in pairs, each passive wireless transponder of a respective one of the pairs opposed to one another across an edge of a selectively openable passage, and repeatedly providing an interrogation signal to the plurality of passive wireless transponders includes providing the interrogation signals which, for each pair cause at least a first passive wireless transponder of a pair to transmit an addressed signal to a second passive wireless transponder of the pair. The passive wireless transponders may be grouped in pairs, each passive wireless transponder of a respective one of the pairs opposed to one another across an edge of at least one flap, and determining whether each of the passive wireless transponders have successfully transmitted to at least one respective neighboring passive wireless transponder in response to each interrogation signal includes, for each pair determining whether at least one of the passive wireless transponders of the pair has successfully transmitted to the other one of the passive wireless transponders of the pair in response to each interrogation signal. The passive wireless transponders may be grouped in pairs, each passive wireless transponder of a respective one of the pairs opposed to one another across an edge of at least one flap, and determining whether each of the passive wireless transponders have successfully transmitted to at least one respective neighboring passive wireless transponder in response to each interrogation signal includes, for each pair determining whether at least one of the passive wireless transponders of the pair has successfully transmitted to the other one of the passive wireless transponders of the pair in response to each interrogation signal which encodes a defined command. The passive wireless transponders may be grouped in pairs, each passive wireless transponder of a respective one of the pairs opposed to one another across an edge of a selectively openable passage, the pairs spaced from one another such that a nearest neighbor of any one of the passive wireless transponders is the other wireless passive transponder of the pair, and determining whether each of the passive wireless transponders have successfully transmitted to at least one respective neighboring passive wireless transponder in response to each interrogation signal includes, for each pair determining whether at least one of the passive wireless transponders of the pair has successfully transmitted to the other one of the passive wireless transponders of the pair in response to each interrogation signal. Repeatedly providing an interrogation signal to the plurality of passive wireless transponders, the interrogation signal which may cause the passive wireless transponders to transmit to at least one neighboring passive wireless transponder may include repeatedly providing the interrogation signal from an interrogator system. Receiving information from at least one of the plurality of passive wireless transponders may include receiving the information by the interrogator system and determining whether each of the passive wireless transponders have successfully transmitted to at least one respective neighboring passive wireless transponder in response to each interrogation signal includes determining by the interrogator system whether each of the passive wireless transponders have successfully transmitted to at least one respective neighboring passive wireless transponder. Receiving information from at least one of the plurality of passive wireless transponders may include receiving the information by a host processor-based system from the interrogator system and determining whether each of the passive wireless transponders have successfully transmitted to at least one respective neighboring passive wireless transponder in response to each interrogation signal includes determining by the host processor-based system whether each of the passive wireless transponders have successfully transmitted to at least one respective neighboring passive wireless transponder.

An interrogator system to determine the relative positions of a plurality of passive wireless transponders may be summarized as including a transceiver to provide an interrogation carrier wave; a processor communicably coupled to the transceiver; and a processor-readable nontransitory storage medium including machine executable instructions that when executed by the processor, cause the processor to: repeatedly transmit an interrogation carrier wave to each of a plurality of passive wireless transponders that causes each of the passive wireless transponders to transmit a backscatter signal to at least one neighboring passive wireless transponder; receive information from at least one of the plurality of passive wireless transponders, the information received from the at least one of the plurality of passive wireless transponders indicative of whether each of the passive wireless transponders have successfully transmitted to at least one respective neighboring passive wireless transponder in response to each received interrogation carrier wave; and determine based on the received information whether each of the passive wireless transponders have successfully transmitted to at least one respective neighboring passive wireless transponder in response to each received interrogation carrier wave.

The machine readable instructions that may cause the processor to repeatedly transmit an interrogation carrier wave to each of a plurality of passive wireless transponders, may further cause the processor to: repeatedly transmit an interrogation carrier wave to grouped pairs of passive wireless transponders, each passive wireless transponder of a respective one of the pairs positioned in opposition to one another across an edge of a selectively openable passage; and wherein the machine readable instructions that cause the processor to receive information from at least one of the plurality of passive wireless transponders, further cause the at least one processor to: receive information from at least one of the plurality of passive wireless transponders, the received information indicative of whether each of the passive wireless transponders have successfully transmitted to at least one respective neighboring passive wireless transponder in response to each interrogation signal includes receiving information form at least one passive wireless transponder of each pair, the received information indicative of whether the passive wireless transponders of the respective pair successively communicated with one another.

The machine readable instructions that may cause the processor to repeatedly transmit an interrogation carrier wave to each of a plurality of passive wireless transponders, may further cause the processor to: repeatedly transmit an interrogation carrier wave to grouped pairs of passive wireless transponders, each passive wireless transponder of a respective one of the pairs positioned in opposition to one another across an edge of a selectively openable passage; and wherein the machine readable instructions that cause the processor to determine based on the received information whether each of the passive wireless transponders have successfully transmitted to at least one respective neighboring passive wireless transponder in response to each received interrogation carrier wave, further cause the at least one processor to: determine for each pair of passive wireless transponders whether at least one of the passive wireless transponders forming the pair has successfully transmitted to the other one of the passive wireless transponders forming the pair in response to each interrogation signal that includes data indicative of an encoded defined command.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Communications systems and protocols that are well known to those of skill in the communications arts or are readily available in the form of standards or similar guidance documents have not been shown or described in detail to avoid unnecessarily obscuring descriptions of the embodiments. Additionally, time-of-flight, time-of-arrival, or differential time-of-arrival based position or location determination methods that are well known to those of skill in the communications arts have not been shown or described in detail herein. Additionally, detailed specifications of well known electronic components such as passive radio frequency identification ("RFID") transducers, RFID interrogators, radio frequency receivers, radio frequency transceivers, processors, nontransitory storage or memory, communication and/or switching protocols and the like have not been shown or described in detail.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1:
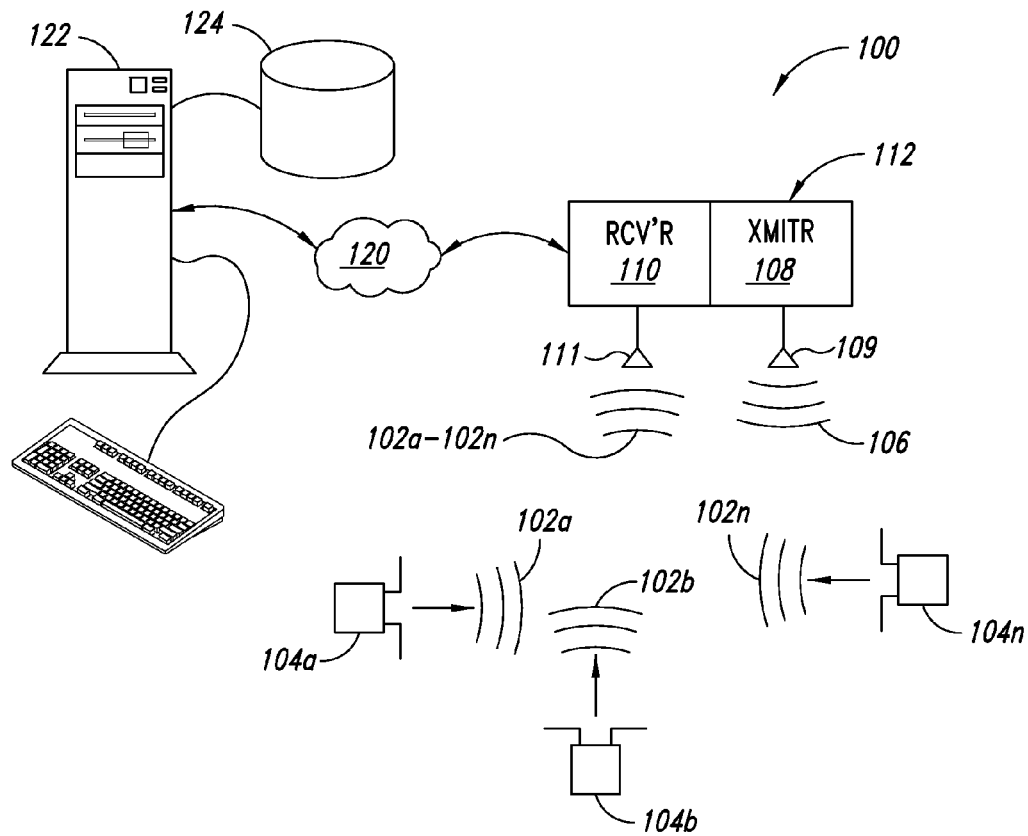
FIG. 1 is a schematic diagram illustrating an example system for providing backscatter communication between each of a number of passive wireless transponders, according to one non-limiting illustrated embodiment.

FIG. 1 shows an illustrative system 100 for providing backscatter waves 102 by any number of passive wireless transducers 104 responsive to illumination by an interrogation carrier wave 106. Any number of passive wireless transducers 104a-104n (collectively "transducers 104") are illuminated by the interrogation carrier wave 106 generated by a radio frequency generator 108 such as a radio frequency identification ("RFID") interrogator. Each transducer 104 includes at least an antenna, an RF front end, and a communicably coupled control circuit. Each transducer 104 may optionally include a nontransitory storage media communicably coupled to the antenna and/or control circuit. Upon receipt of the interrogation carrier wave 106, the RF front end derives power from the interrogation signal or carrier wave to power the transducer. The transducers 104 backscatter a portion of the incident energy received via the interrogation carrier wave 106 as backscatter wave 102. The transducer may impose data or information on the backscatter wave. For example, the transducers may impose or encode a unique identifier of the transponder on the backscatter wave 102.

For example, upon receiving an interrogation carrier wave 106 generated by an RF transmitter 108, a first transducer 104a generates a backscatter wave 102a receivable by any number of second transducers 104b-104n and optionally by a receiver 110 disposed in a reader or interrogator device 112. Similarly, each of the second transducers 104b-104n also generates a respective backscatter wave 102b-102n. The backscatter waves 102a-102n generated by each of the respective transducers 104a-104n provides a communicable coupling between the transducers 104. Information, for example data indicative of a unique transducer identifier may thus be exchanged between transducers 104. Using such communications, each transducer 104 is able to detect, identify, or otherwise "learn" those other transducers 104 with which a communicable coupling is possible (i.e., those "other" transducers that can be considered "in the neighborhood" of, or neighboring, the respective transducer).

In some instances, each transducer 104n backscatters a respective backscatter wave 102n having data or information modulated thereon that is uniquely indicative of the respective transducer 104*n* backscattering the backscatter wave 102*n*. In at least some instances, a reader or interrogator 112 may receive the backscatter wave 102*n* containing the information. In other instances, the backscatter wave 102*n* may carry or otherwise include modulated data representative of information, commands, and/or instructions communicated between some or all of the transducers 104*a*-104*n*, or between some or all of the transducers 104*a*-104*n* and a receiver 110 in a reader or interrogator 112. In some instances, the backscatter wave 102 provided by each transducer 104 may be limited in range or signal strength such that only a nearest neighbor transducer 104 is able to receive the backscatter wave 102. In other instances, the backscatter wave 102 provided by each transducer 104 may be limited in range or signal strength such that only limited number of transducers (e.g., nearest and "next nearest" neighboring transducers) are able to receive the backscatter wave 102.

The transducers 104*a*-104*n* can include any type or style of current or future developed passive, wireless, radio frequency transducer. At its most basic, each transducer 104 includes at least an antenna and a communicably coupled control circuit arranged or configured such that a portion of an incident interrogation carrier wave 106 within a particular, defined, radio frequency band causes the transducer 104 to generate a backscatter wave 102 which is broadcast via the antenna. As discussed above, in some instances, one or more nontransitory storage media may be communicably coupled to the control circuit.

Such nontransitory storage media may include volatile and/or non-volatile nontransitory memory. Such storage media may be read-only or read/write capable. Non-limiting examples of such memory include: read only memory (ROM), random access memory (RAM), dynamic random access memory (DRAM), electrically erasable programmable read only memory (EEPROM), and flash memory. In some instances, the storage media stores or otherwise retains data representative of an identifier unique to the transducer 104. In at least some instances, the data representative of the identifier unique to the transducer 104*n* may be modulated onto the backscatter wave 102*n* by the control circuit.

The control circuit may have the capability to execute one or more machine executable instruction sets upon energization by a received interrogation carrier wave 106. In some instances, all or a portion of the machine executable instruction set may be stored in the nontransitory storage coupled to the control circuit. In other instances, all or a portion of the machine executable instruction set may be encoded or otherwise transported as a signal modulated on the incoming interrogation carrier wave 106. In yet other instances, all or a portion of the machine executable instruction set may be encoded or otherwise transported as a signal modulated on a backscatter wave 102*n* generated by another transducer 104*n*. Where such a received backscatter wave 102*n* contains modulated information including one or more commands or machine executable instruction sets executable by a transducer control circuit, the control circuit in the recipient transducer 104 can extract and execute the received instructions.

In addition to backscattering its own wave 102, some or all of the transducers 104 may also beneficially receive backscatter waves generated by other, neighboring, transducers. Where the received backscatter wave carries modulated information identifying the transducer 104*n* responsible for backscattering the wave, such may be used by the recipient transducer 104 to uniquely identify the neighboring transducer 104*n*. Each transducer 104 may use the properties or parameters of each received backscatter wave 102 to determine one or more aspects of the relative spatial relationship between the transducer 104 and the other, neighboring, transducer(s) 104 backscattering the received waves 102. Such backscatter wave properties or parameters may include, but are not limited to, received signal strength ("RSSI") and/or time-of-flight ("TOF"). For example, transducer 104*a* may receive three backscatter waves 102*b*, 102*c*, and 102*d* backscattered respectively by transducers 104*b*, 104*c*, and 104*d*. Based on the received signal strengths of the backscatter waves 102*b*, 102*c*, and 102*d*, the transducer 104*a* can determine transducer 104*c* is physically closest (i.e., highest RSSI), 104*d* is physically next closest, and 104*b* is physically most distant (i.e., lowest RSSI).

In another example, transducer 104*a* may backscatter a wave 102*a* including defined information or data that is received by transducers 104*b*, 104*c*, and 104*d*. In turn, each of transducers 104*b*-104*d* backscatters a respective wave 102*b*, 102*c*, and 102*d* that includes information or data identifiable to transponder 104*a*. The backscatter waves 102*b*, 102*c*, and 102*d* are received by transducer 104*a* at different times based on the relative distance between transducer 104*a* and each of transducers 104*b*, 104*c*, and 104*d*. Using the time-of-flight (i.e., the time required for the waves 102*b*, 102*c*, and 102*d* backscattered by transducer 104*a* to return to transducer 104*a*), transducer 104*a* determines the relative location and/or distance to each of the transducers 104*b*-104*d*.

The transmitter 108 can include any device or system capable of generating an interrogation carrier wave 106 in the radio frequency or microwave frequency spectrum. The interrogation carrier wave 106 is generated at a frequency and phase sufficient to wirelessly transfer or otherwise impart at least a portion of the energy of the interrogation carrier wave 106 to one or more transducers 104 via the RF front end of the transducer. In at least some instances, the transmitter 108 generates only the interrogation carrier wave without modulating or otherwise imposing data in the form of a signal on the interrogation carrier wave 106. In other instances, the transmitter 108 generates the interrogation carrier wave 106 with information in the form of a signal modulated or otherwise imposed on the interrogation carrier wave 106. At least a portion of the information (e.g., data, commands, combinations of data and commands) that is modulated on the interrogation carrier wave 106 is received by the transducers 104.

The receiver 110 can include any device or system capable of receiving some or all of the waves 102*a*-102*n* backscattered by the transducers 104*a*-104*n* responsive to the receipt of the interrogation carrier wave 106 generated by the transmitter 108. In some instances, the transmitter 108 and the receiver 110 may be partially or completely integrated into a single device, i.e., a transceiver. In some instances, the transmitter 108 and receiver 110 may be positioned in a single handheld or portable device as exemplified by a handheld RFID interrogator. In other instance, the transmitter 108 and receiver 110 may be discrete components located in different locations, enclosures, or housings.

The transmitter 108, the receiver 110, or both the transmitter and the receiver may be communicably coupled to a communications interface (not shown in FIG. 1) that enables communication with a host device 120 via one or more intervening networks 122 (e.g., local area network, enterprise network, wide area network, world-wide network, the Internet). In at least some instances, an interrogator 112 that includes both a transmitter 108 and a receiver 110 may be a dedicated device having only limited processing speed or capability. To perform processor intensive computations, the interrogator 112 may communicate some or all of the data received from the transponders 104a-104n to the external host device 120. Such data may include for example, received data indicative of the identity of each transponder's "nearest neighbor" transponder or received data indicative of the identity of transponder(s) located in a particular transponder's "neighborhood."

The external host device 120 can include any system, devices, or combination of systems and devices communicably coupled to one or more communications interfaces capable of bidirectionally exchanging data with the interrogator 112. In some instances, external host device 120 may be collocated with the interrogator 112. In other instances, the external host device 120 may be located remote from the interrogator 112. At least some instances, one or more networks 122 communicably coupled a single external host device 120 to a plurality of interrogators 112. One or more nontransitory storage devices 124 may be included in or communicably coupled to the external host device 120. The nontransitory storage devices 124 may include one or more data stores or databases containing transponder identification data such as data indicative of unique identifiers associated with transponders 104a-104n.

Figure 2:
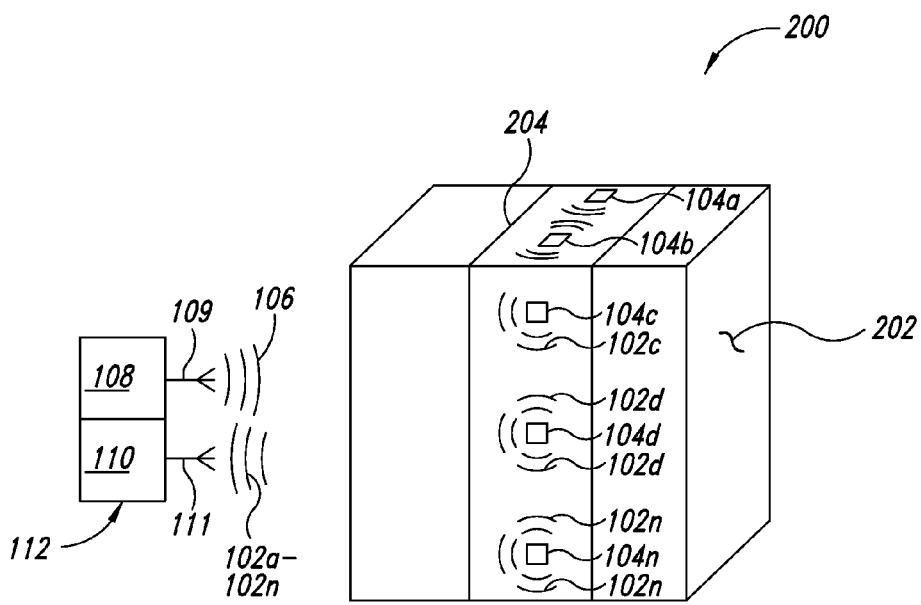
FIG. 2 is a schematic diagram illustrating an example substrate including a number of frangible passive wireless transmitters able to backscatter communicate with at least one other passive wireless transmitter in the presence of an interrogation carrier wave, according to one non-limiting illustrated embodiment.

FIG. 2 shows an illustrative system 200 in which an object or enclosure 202 (e.g., a cardboard shipping container or box) is sealed using an adhesive backed substrate 204 containing a number of transducers 104. In at least some implementations, each of the transducers 104a-104n embedded in the substrate may include one or more frangible or disruptable elements that are positioned upon and/or coupled to the substrate 204 in a manner such that any attempt to remove or otherwise interrupt the continuity of the substrate 204 results in the physical and/or electrical destruction of at least one of the transducers 104. In other instances, the substrate 204 includes individual transducers 104a-104n positioned in physical locations beyond which one or more transducers 104 are unable to recognize or identify a "nearest neighbor." Such positioning may result in the inability for at least one transducer to identify at least one of its nearest neighbors in response to any disruption to the continuity of the substrate (e.g., by cutting or tearing). Such substrates 204 are beneficial in deterring and detecting unauthorized access to the interior portion and/or contents of the enclosure 202.

In a first implementation, an interrogator 112 receives backscatter waves 102a-102n, each provided by a respective transducer 104a-104n responsive to the receipt of an interrogation signal 106. In such an implementation, each of the backscatter waves 102a-102n includes data indicative of the identity of the backscattering transducer. Upon receipt of the backscattered waves 102a-102n, the interrogator 112 and/or external host system 120 determines whether the data indicative of the identities of the transducers 104a-104n providing the backscattered waves 102a-102n compare favorably with stored data indicative of the identities of the transducers 104a-104n included in the substrate 204 attached or otherwise coupled to the particular enclosure 202. In at least some instances, a nontransitory storage medium communicably coupled to the interrogator 112 or the external host system 120. If the interrogator 112 or the external host system 120 determines a mismatch or if a number of transducers 104 exceeding a defined threshold fail to respond, the interrogator 112 at least one human-perceptible output capable of alerting a system user of potential tampering with the enclosure 202 is provided.

In a second implementation, the transducers 104a-104n unidirectionally communicate via backscatter waves 102a-102n data indicative of a command or similar information to each successive nearest neighbor transducer until the command or signal transits a closed loop pathway formed by the substrate 204. In at least some instances, the substrate 204 extends continuously around a perimeter of the enclosure 202. In such instances, the interrogator 112 provides an interrogation carrier wave 106 to a first transducer 104a. Responsive to the receipt of the interrogation carrier wave 106, the first transducer 104a backscatters a wave 102a that includes instructions or other data that causes at least the "nearest neighbor" transducer 104b to backscatter a wave 102b that includes similar instructions or data. Each subsequent transducer $104_x$ in turn, backscatters a one-way, "daisy-chain," type wave $102_x$ that include instructions or data that cause the next "nearest neighbor" transducer $104_{x+1}$ to backscatter a wave $102_{x+1}$ containing the instructions or data. Each transponder 104a-104n included in the substrate 204 thus passes the instructions or data to the "nearest neighbor" transponder in a manner similar to a "token." The process is repeated sequentially until the backscatter wave 102n backscattered by the "last" transducer 104n in the substrate is received by the first transducer 104a, or until a damaged or displaced transducer 104 prevents the backscattering of the wave 102 that includes the instructions or data to a "nearest neighbor" transponder.

In some instances, upon the return of the instruction, command, or data to the first transponder 104a, the first transponder 104a backscatters a wave 102a receivable by the interrogator 112 that includes data representative of a "SUCCESS" message. On the other hand, upon a failure of the instruction, command, or data to return to the first transducer 104a within a defined time interval, the first transponder 104a backscatters a wave 102a receivable by the interrogator 112 that includes data representative of a "FAILURE" message. In turn, the interrogator 112 and/or a communicably coupled external host system 120 can provide at least one human-perceptible output capable of alerting a system user of potential tampering with the enclosure 202.

In a third implementation, the transducers 104a-104n communicate via backscatter waves 102a-102n data indicative of instructions or data to each successive nearest neighbor transducer until the command or data reaches the "end" of the pathway formed by an open-ended (i.e., not forming a closed loop) substrate 204. In at least some instances, the substrate 204 extends only partially around a perimeter of the enclosure 202. In such instances, the interrogator 112 provides an interrogation carrier wave 106 to a first transducer 104a. Responsive to the receipt of the interrogation carrier wave 106, a first transducer 104a on the substrate 204 generates a backscatter wave 102a that includes instructions or other data that causes at least the "nearest neighbor" transducer 104b to backscatter a wave 102b that includes similar instructions or data. Each subsequent transducer $104_x$ in turn, backscatters a one-way, "daisy-chain," type wave $102_x$ that includes instructions causing the next "nearest neighbor" transducer $104_{x+1}$ to backscatter a wave $102_{x+1}$ that includes the instructions or data. Each transponder 104a-104n thus passes the instructions or data to the "nearest neighbor" transponder in a manner similar to a "token."

The process is repeated sequentially until the defined "last" transducer 104n in the substrate 204 receives the wave 102 backscattered by its "nearest neighbor." The "last" transponder 104n then backscatters a wave 102n that includes data representative of the instructions or data in a reverse direction back to the "nearest neighbor" providing the incoming backscatter wave $102n$. Each subsequent transducer $104_x$ in turn, backscatters a one-way, "daisy-chain," type wave $102_x$ that includes instructions causing the next "nearest neighbor" transducer $104_{x-1}$ to backscatter a wave $102_{x-1}$ that includes the instructions or data to a "nearest neighbor" transponder. Each transponder $104a$-$104n$ included in the substrate 204 thus passes on two occasions (i.e., once in a "forward" direction and once in a "reverse" direction) the instructions or data to the "nearest neighbor" transponder in a manner similar to a "token." The process is repeated sequentially until the wave $102b$ backscattered by the second transducer $104b$ in the substrate is received by the first transducer $104a$, or until a damaged or displaced transducer 104 prevents the transmission of the backscatter wave 102 containing the instruction or data to a "nearest neighbor" transponder.

In some instances, upon the return of the instruction, command, or data to the first transponder $104a$, the first transponder $104a$ backscatters a wave $102a$ receivable by the interrogator 112 that includes data representative of a "SUCCESS" message. On the other hand, upon a failure of the instruction, command, or data to return to the first transducer $104a$ within a defined time interval, the first transponder $104a$ backscatters a wave $102a$ receivable by the interrogator 112 that includes data representative of a "FAILURE" message. In turn, the interrogator 112 and/or a communicably coupled external host system 120 can provide at least one human-perceptible output capable of alerting a system user of potential tampering with the enclosure 202.

Thus, in some instances any alteration to or disruption of the substrate 204 causes the generation by the interrogator 112 and/or external host system 120 of an output indicative of tampering with the enclosure 202. In other instances, any alteration to or disruption of the substrate 204 interrupts the one-way or bidirectional transmission of a backscatter wave 102 that includes instructions or data in a "daisy-chain" manner between "nearest neighbors" or proximately positioned passive wireless transponders 104. In either event, a failure of a passive wireless transponder 104 to respond with a backscatter wave 102 provides the interrogator 112 with an indication that the substrate 204 includes damaged or displaced transponders $104a$-$104n$ that may indicate unauthorized tampering with the enclosure 202.

Figure 3:
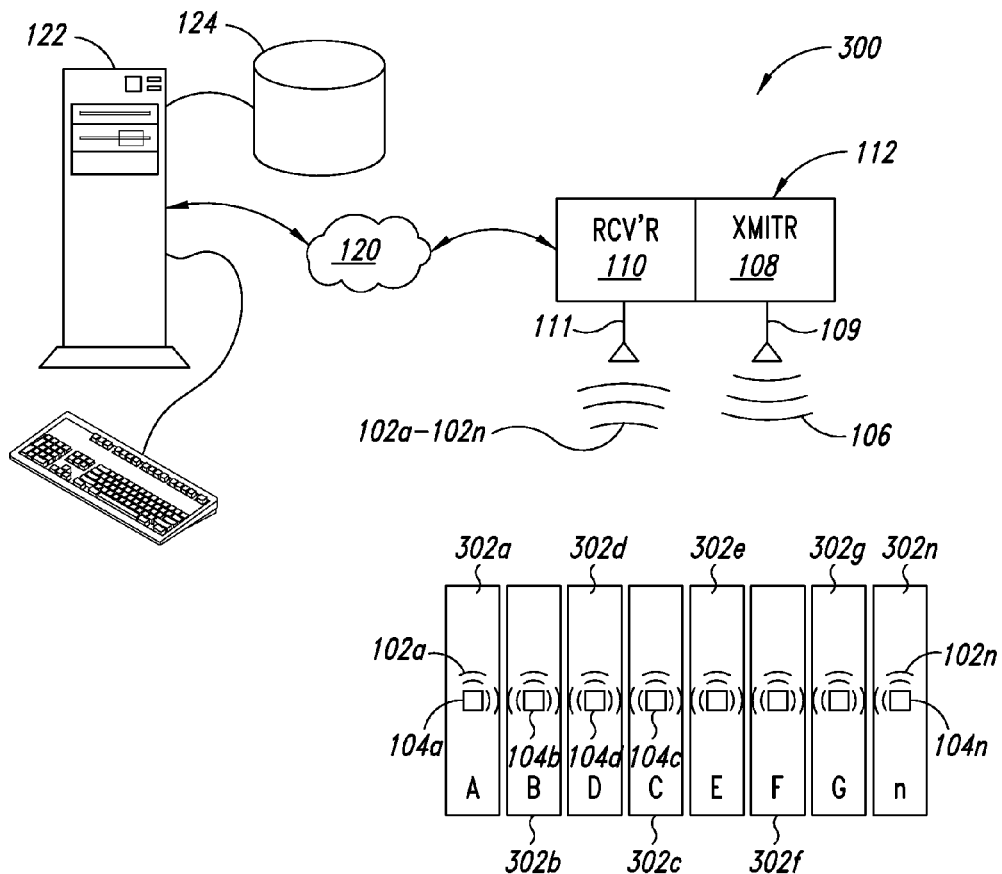
FIG. 3 is a schematic diagram illustrating an example arrangement of ordered items each including a passive wireless transmitter able to backscatter communicate with at least one neighboring passive wireless transmitter in the presence of an interrogation carrier wave, according to one non-limiting illustrated embodiment.

FIG. 3 shows an illustrative system 300 in which a number of objects $302a$-$302n$ (collectively "objects 302"), each having a respective passive wireless transponder $104a$-$104n$ physically coupled thereto, are arranged in a defined order and illuminated by an interrogation carrier wave 106 provided by an interrogator 112. Each of the passive wireless transponders $104a$-$104n$ can include a communicably coupled nontransitory storage that includes data indicative of a unique identifier associated with the respective transducer 104. Library books, each containing a uniquely identifiable RFID tag that are arranged in a defined order on a library shelf provide but one simple example of such an arrangement of objects 302.

In a first implementation, an interrogator 112 receives waves $102a$-$102n$, each backscattered by a respective passive wireless transponder $104a$-$104n$ responsive to the receipt of an interrogation carrier wave 106. In such an implementation, upon receipt of the interrogation carrier wave 106, each of the passive wireless transponders $102a$-$102n$ determines, using backscatter waves 102 the identity of its "nearest neighbor" transponders 104. Thus, as depicted in FIG. 3, transponder $104b$ would receive backscatter waves $102a$ and $102d$ and identify transponders $104a$ and $104d$ as "nearest neighbors." Similarly, transponder $104d$ would receive backscatter waves $102b$ and $102c$ and identify transponders $104b$ and $104c$ as "nearest neighbors." Each passive wireless transponder would then backscatter a respective wave 102 that includes data indicative of the identified "nearest neighbors." Continuing with the example in FIG. 3, transponder $104b$ would backscatter a signal that includes data indicating transponders $104a$ and $104d$ as "nearest neighbors." Each of the transponders $104a$-$104n$ would backscatter a respective wave $102a$-$102n$ that includes similar "nearest neighbor" data.

Upon receipt of the backscattered waves $102a$-$102n$, the interrogator 112 and/or external host system 120 determines whether the "nearest neighbor" data provided by each of the transponders $104a$-$104n$ compares favorably with stored data indicative of the identities of the "nearest neighbor" transponders $104a$-$104n$. Responsive to the detection of discrepancies between the "nearest neighbor" data provided by each transponder $104a$-$104n$ and the stored "nearest neighbor" data, the interrogator 112 and/or the communicably coupled external host system 120 generates one or more human-perceptible alerts.

In a second implementation, each of the transponders $104a$-$104n$ includes a nontransitory storage containing data indicative of the identified nearest neighbor transponders. Thus, for example, the nontransitory storage in transponder $104b$ will contain data indicative of the identity of nearest neighbor transponders $104a$ and $104c$. In response to a received interrogation carrier wave 106, each transponder $104a$-$104n$ can determine the identity of one or more "nearest neighbor" transponder 104, for example by generating a backscatter wave 102 and measuring the received signal strength of backscatter waves 102 generated by other transponders. After determining the identity of one or more nearest neighbor transducers, each transducer $104a$-$104n$ compares the identity of the determined nearest neighbor transponder with the stored data indicative of the identity of nearest neighbor transponders.

Responsive to the detection of discrepancies between the determined nearest neighbor transponder data and the stored nearest neighbor transponder data, a transponder 104 generates a backscatter wave 102 that includes data indicative of the discrepancy. For example, if transponder $104b$ detects the identities of determined nearest neighbors do not include transponders $104a$ and $104c$, but instead include transponders $104a$ and $104d$, transponder $104b$ can generate a backscatter signal $102b$ that includes an error message indicative of the discrepancy. In some instances, the error message provided by the transponder may include additional data indicative of the determined nearest neighbors. Responsive to the receipt of a backscatter wave 102 including data indicative of a discrepancy, the interrogator 206 generates one or more human-perceptible alerts. If the transponders $104a$-$104n$ provide determined nearest neighbor data to the interrogator 206, the interrogator may advantageously identify those objects that are out of order and may also advantageously identify the appropriate locations of the misplaced objects.

Figure 4:
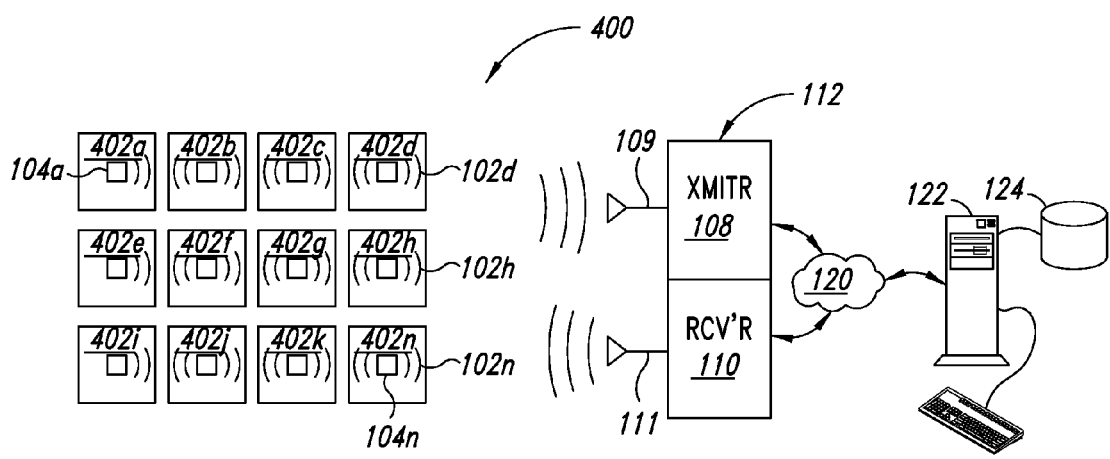
FIG. 4 is a schematic diagram illustrating an example arrangement of ordered items each including a passive wireless transmitter able to backscatter communicate with at least one neighboring passive wireless transmitter in the presence of an interrogation carrier wave, according to one non-limiting illustrated embodiment.

FIG. 4 shows an illustrative system 400 in which a number of objects $402a$-$402n$, each having a respective transducer $104a$-$104n$ physically coupled thereto, are arranged in a defined two-dimensional order and illuminated by an interrogation carrier wave 106 provided by an interrogator 206. Each of the transducers $104a$-$104n$ can include a nontransitory storage that includes data indicative of a unique identifier associated with the transducer 104. Shoe boxes, each containing a uniquely identifiable RFID tag that are arranged in a defined two-dimensional matrix on store shelf provide a simple example of such an arrangement of tagged objects.

In operation, upon receipt of an interrogation carrier wave 106, each of the transponders 104 can respond by firstly generating one or more backscatter waves 102 to determine the identities of the nearest neighbor transponders, and secondly by communicating a backscatter wave 102 including data indicative of the identities of the determined nearest neighbor transponders to the interrogator 206. Upon receiving information indicative of the nearest neighbor transponders from some or all of the transponders 104, the interrogator 206 determines the relative spatial relationship between at least some of the objects 402a-402n based on the returned transponder data. In at least some instances, the interrogator 206 provides the system user with a human perceptible output (e.g., a display) of the relative spatial relationship between the objects 402 based on the received transponder data. In some instances, the interrogator 206 can advantageously provide the system user with an indication of the location of a defined object, for example the location of a specific shoe box on a wall containing a large number of physically similar or identical shoe boxes.

In a first implementation, in response to a received interrogation carrier wave 106, each transponder 104a-104n determines the identity of one or more "nearest neighbor" transducers. In such instances, each transponder 104a-104n generates at least one backscatter wave 102 and determines the identity of one or more nearest neighbor transponders, for example using the RSSI or TOF techniques previously discussed. After determining the identity of the one or more nearest neighbor transducers, each transducer 104a-104n generates a backscatter wave 102a-102n that includes data indicative of the determined nearest neighbor transducers. For example, transducer 402f will generate a backscatter wave 102d including data identifying transponders 104a, 104b, 104c, 104e, 104g, 104i, 104j, and 104k as nearest neighbor transponders. Each transponder 104a-104n illuminated by the interrogation carrier wave 106 will perform a similar determination of the identities of the nearest neighbor transponders and will return the nearest neighbor identities to the interrogator 206 as data included in a backscatter wave 102a-102n.

The interrogator 206 combines the nearest neighbor identity data received from the transponders 104a-104n to determine the relative spatial location, position, or configuration of each transponder with respect to at least a portion of the other transponders. Identifying the relative location, position, or configuration of each transponder advantageously permits the interrogator to determine the relative spatial location, position or configuration of the object attached to each transponder. In at least some instances, each of the transponders 104 may perform all or a portion of the spatial location, position, or configuration determination and communicate such data to the interrogator 206 via data included in a backscatter wave 106. The interrogator 206 may include one or more output devices capable of providing the system user with an indication of the location of a particular transponder and/or object relative to other transponders or objects. Thus, for example, an interrogator may advantageously permit a warehouse worker to identify a particular item located on a number of stacked shelves containing a large number of outwardly similar items.

Figure 5A:
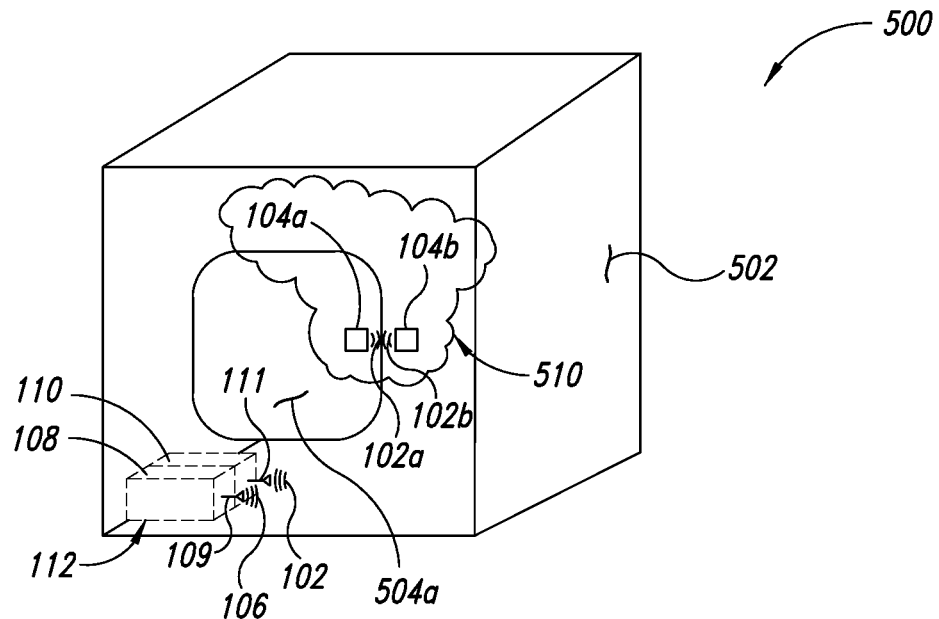
FIGS. 5A and 5B are schematic diagrams illustrating an example arrangement of at least one pair of passive wireless transmitters arranged to detect the opening of an enclosure via backscatter communication in the presence of an interrogation carrier wave, according to one non-limiting illustrated embodiment.
Figure 5B:
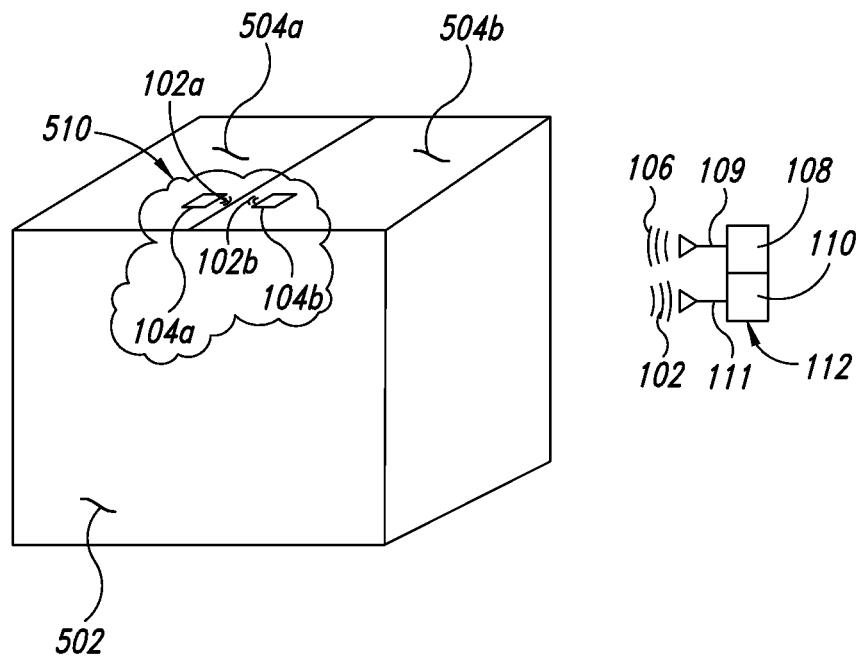

FIGS. 5A and 5B show an illustrative system 500 in which an enclosure 502 includes one or more displaceable members 504a-504n for accessing an internal volume or space located at least partially within the enclosure 502. Although only one is shown in FIGS. 5A and 5B, transponder pairs 510, each including two transponders 104a and 104b, are positioned proximate and across an edge of a void providing access to the interior of the enclosure. For example, in FIG. 5A, a first transponder 104a is positioned on a removable door 504 and a second transponder 104b is positioned on the enclosure 502 such that the transponders 104a and 104b are proximate when the door 504 is in a CLOSED position and distal when the door 504 is in an OPEN position. In another example, in FIG. 5B, a first sensor 104a is positioned on a first box flap 504a and a second sensor 104b is positioned on a second box flax 504b such that sensors 104a and 104b are proximate when the box flaps are in a CLOSED position and distal when either or both of the box flaps are in an OPEN position.

FIG. 5A shows an interrogator 206 positioned internal to the enclosure 502, FIG. 5B shows an interrogator 206 positioned external to the enclosure 502. Either continuously or periodically, the interrogator 206 generates an interrogation carrier wave 106. Upon receiving the interrogation carrier wave 106, the transponders 104a, 104b in each transponder pair 510 determine whether they are positioned in a "nearest neighbor" or proximate position indicating the displaceable member(s) 504 is in a CLOSED position and the interior of the enclosure 502 is inaccessible. If the transponders 104a, 104b are not positioned in a "nearest neighbor" or proximate position, the displaceable member(s) 504 are in an OPEN position and the interior of the enclosure 502 is accessible. Thus, the position of the transponders 104a, 104b can provide an indication of whether the enclosure 502 has been broached and the interior portion accessed. One or both transponders 104a, 104b in each transponder pair 510 generate a backscatter wave 102a, 102b including data indicative of the nearest neighbor transponder (if any). The interrogator 206 receives the backscatter signal and generates a signal indicative of whether the transponders are physically disposed proximate (i.e., in a "nearest neighbor" configuration) or distal (i.e., not in a "nearest neighbor" configuration). The interrogator 206 can store in a communicably coupled nontransitory storage data indicative of the relative spatial relationship (i.e., proximate or distal) of the transponders 104 in each transponder pair 510 attached to the enclosure 502. Storing data indicative of the relative spatial relationship of the transponders 104 provides a historical record indicative of an occurrence where the interior of the enclosure 502 was accessible. In some instances, the interrogator 206 can communicate an alert to one or more external devices when a distal relative spatial relationship between the transponders 104 in one or more transponder pairs 510 is detected.

Figure 6:
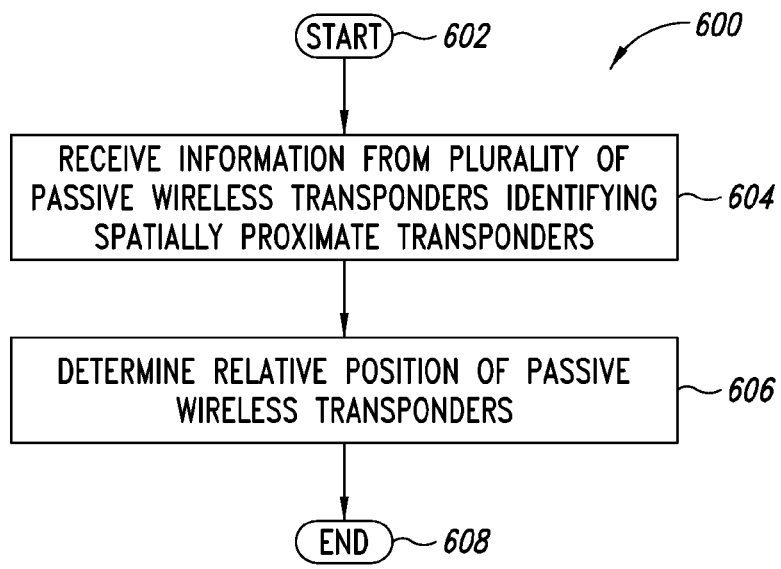
FIG. 6 is a high level logic flow diagram of an illustrative method for determining the relative spatial relationship between passive wireless transponders, according to one non-limiting illustrated embodiment.

FIG. 6 shows a high level method 600 of determining the relative spatial position of passive wireless transponders 104. A radio frequency generator 108 generates an interrogation carrier wave 106 that illuminates a number of passive wireless transponders 104a-104n. Responsive to the receipt of the interrogation carrier wave 106, each of the transponders 104a-104n generates a respective backscatter wave 102a-102n. In turn, each of the transponders 104a-104n receives one or more backscatter waves 102a-102n generated by other transponders. In at least some instances, the transponders 104a-104n use one or more received backscatter wave properties (e.g., received signal strength or "RSSI") to determine the relative distance between the transponder originating the backscatter wave and the transponder receiving the backscatter wave. In other instances, each transponder 104 broadcasts a backscatter wave to all or a portion of the remaining transponders and measures the time-of-flight of the backscatter signals provided by all or a portion of the remaining transponders to determine the relative distance between the transponder originating the backscatter wave and the transponder receiving the backscatter wave. The method 600 of determining the relative spatial position of a number of passive wireless transponders commences at 602.

At 604, an external host device 110 receives from each of a number of passive wireless transponders 104a-104n a respective backscatter signal 102a-102n that includes information indicative of at least one neighboring passive wireless transponder spatially proximate the respective passive wireless transponder 104a-104n from which the information is received. Such information may be modulated on, encoded in, or otherwise carried by the backscatter wave 102 generated by the respective transponder 104.

At 606, using the information indicative of the at least one neighboring passive wireless transponder that is spatially proximate the respective passive wireless transponder 104a-104n from which the information is received, the external host device 110 determines the relative position of the passive wireless transponders 104. For example, if transponder 104a returns a backscatter wave 102a that includes data indicative that transponder 104c is spatially proximate, transponder 104c returns a backscatter wave 102c that includes data indicative that transponder 104e is spatially proximate, and transponder 104e returns a backscatter wave 102e that includes data indicative that transponder 104g is spatially proximate, the external host device 110 can deduce the relative spatial position of the transponders is A-C-E-G. The method 600 of determining the relative spatial position of a number of passive wireless transponders concludes at 608.

Figure 7:
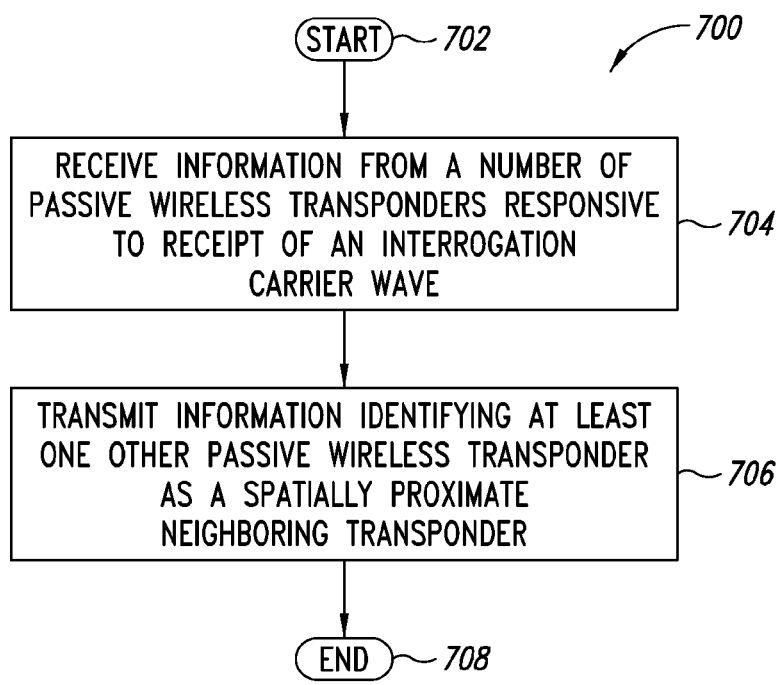
FIG. 7 is a high level logic flow diagram of an illustrative method for determining the presence of a nearest neighbor spatial relationship between passive wireless transponders, according to one non-limiting illustrated embodiment.

FIG. 7 shows a high level method 700 of determining by each of a number of passive wireless transponders the relative spatial position of one or more other spatially proximate passive wireless transponder(s) 104. Each of a number of passive wireless transponders 104a-104n receives an interrogation carrier wave 106. Responsive to the receipt of the interrogation carrier wave 106, each of the transponders 104a-104n generates a respective backscatter wave 102a-102n. Based on one or more backscatter wave 102a-102n properties or parameters, each of the transponders 104a-104n determines which of the other passive wireless transponders represent spatially proximate neighboring transponders. In some instances, received signal strength or "RSSI" is used by the transponder to determine which of the other transponders is spatially proximate. In other instances, the time of flight of a backscatter wave returned by each of the other transponders is used by the transponder to determine which of the other transponders is spatially proximate. The method 700 of determining by each of a number of passive wireless transponders the relative spatial position of one or more other spatially proximate passive wireless transponder(s) commences at 702.

At 704, each of a number of passive wireless transponders 104a-104n receives an interrogation carrier wave 106 provided by an RF generator 108.

In response to receiving the interrogation carrier wave, each transponders 104a-104n generates a respective backscatter wave 102a-102n. In at least some instances, the backscatter wave 102 generated by each transponder 104 may include information such as a unique identifier assigned to the respective transponder 104 generating the backscatter wave 102. Based on one or more properties or parameters of each received backscatter wave 102, each transponder 104 determines which of the other passive wireless transponders represent spatially proximate neighboring transponders. In some instances, received signal strength or "RSSI" is used by the transponder to determine which of the other passive wireless transponders is spatially proximate. In other instances, the time of flight of a backscatter wave returned by each of the other passive wireless transponders is used by the transponder to determine which of the other passive wireless transponders is spatially proximate.

At 706, each of the passive wireless transponders 104a-104n generates a respective backscatter wave 102a-102n that includes information indicative of the identity of one or more other spatially proximate transponders as determined at 704. The method 700 of determining by each of a number of passive wireless transponders the relative spatial position of one or more other spatially proximate passive wireless transponder(s) concludes at 708.

Figure 8:
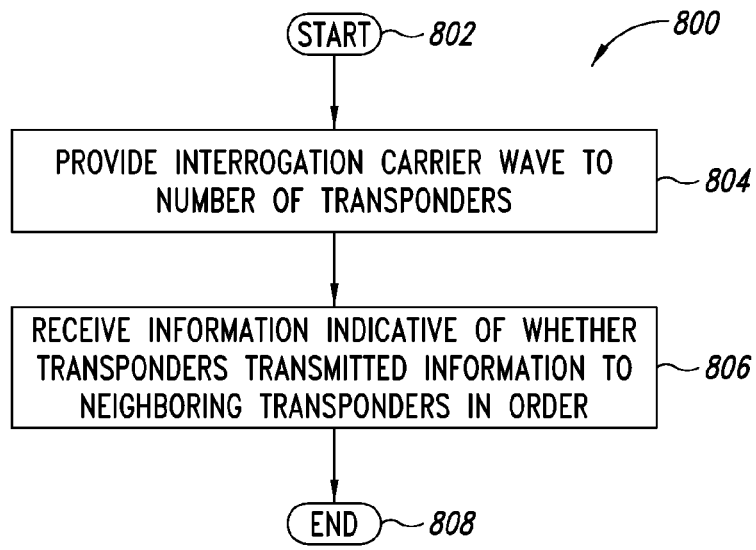
FIG. 8 is a high level logic flow diagram of an illustrative method for determining whether a defined signal has passed sequentially through a number of neighboring passive wireless transponders, according to one non-limiting illustrated embodiment.

FIG. 8 shows a high level method 800 of determining interruptions in a known sequence of passive wireless transponders based on the sequential rebroadcast of a backscatter wave from transponder to neighboring transponder in a defined sequence. A number of passive wireless transponders 104 may be physically configured such that neighboring transponders 104 are arranged in a known or defined order. For example, a number of passive wireless transponders 104a-104n may be coupled to a substrate in a known or defined order. In at least some instances, the substrate may include a material such as an adhesive backed tape useful for sealing packages prior to placing the packages into commerce and the passive wireless transponders 104 can include frangible passive wireless transponders that are rendered inoperable if damaged (e.g., cut through) or if the substrate is forcibly removed from a surface (e.g., torn off a package). Such an implementation advantageously provides an indication of tampering with the substrate and/or the item to which the substrate is attached.

In some instances, the substrate 204 may be applied about the continuously about a perimeter of a package 202 such that the ends of the substrate "meet" or otherwise fall adjacent to each other. In such instances, the passive wireless transponders 104a-104n disposed in the substrate form a "loop" about the package and the backscatter waves 102 sequentially communicated by each transponder 104 to a neighboring transponder 104 will work their way in a single direction around the loop back to the originating or "first" transponder that initiated the sequential transmission of the backscatter wave 102.

In other instances, the substrate 204 may be applied to only a portion of the perimeter of a package and the ends of the substrate do not meet or otherwise fall adjacent to each other. In such instances, the passive wireless transponders 104a-104n disposed in the substrate form an open loop and the backscatter waves 102 sequentially communicated by each transponder 104 to a neighboring transponder 104 will work their way from the transponder at the first end of the substrate to the transponder at the second end of the substrate 204. In some instances, the backscatter waves 102 sequentially communicated by each transponder 104 to a neighboring transponder 104 will work their way from the transponder at the first end of the substrate to the transponder at the second end of the substrate 204 and back the transponder at the first end of the substrate 204. The method of determining interruptions in a known sequence of passive wireless transponders based on the sequential rebroadcast of a backscatter wave from transponder to neighboring transponder in a defined sequence commences at 802.

At 804, an interrogation carrier wave 106 is provided to a number of passive wireless transponders 104a-104n arranged in a defined series, sequence, or configuration. Responsive to the receipt of the interrogation signal 106, a first passive wireless transponder 104*a* communicates a backscatter wave 102*a* to a neighboring transponder 104*b*, which in turn communicates a backscatter wave 102*b* to a neighboring transponder 104*c*, and so on. A damaged or missing transponder 104 interrupts the sequential transmission of the backscatter wave 102. In at least some instances, a respective nontransitory storage media communicably coupled to each transponder 104 can store data indicative of the source of the received backscatter wave 102.

At 806, at least one of the passive wireless transponders 104 generates a respective backscatter wave 102 that includes data indicative of whether each of the passive wireless transponders have successfully transmitted to a respective neighboring passive wireless transponder in a defined order. In some implementations, such a backscatter wave 102 is communicated to the interrogator by the "first" or originating transponder 104. Such a transponder may be positioned at the first end of a substrate attached to a first object in a defined series of objects. In such instances, the first transponder 104 can generate the backscatter signal responsive to receiving from a neighboring transponder a backscatter wave 102 indicative of a successful sequential transmission of the backscatter wave 102 by a defined sequence of transponders 104*a*-104*n*.

Figure 9:
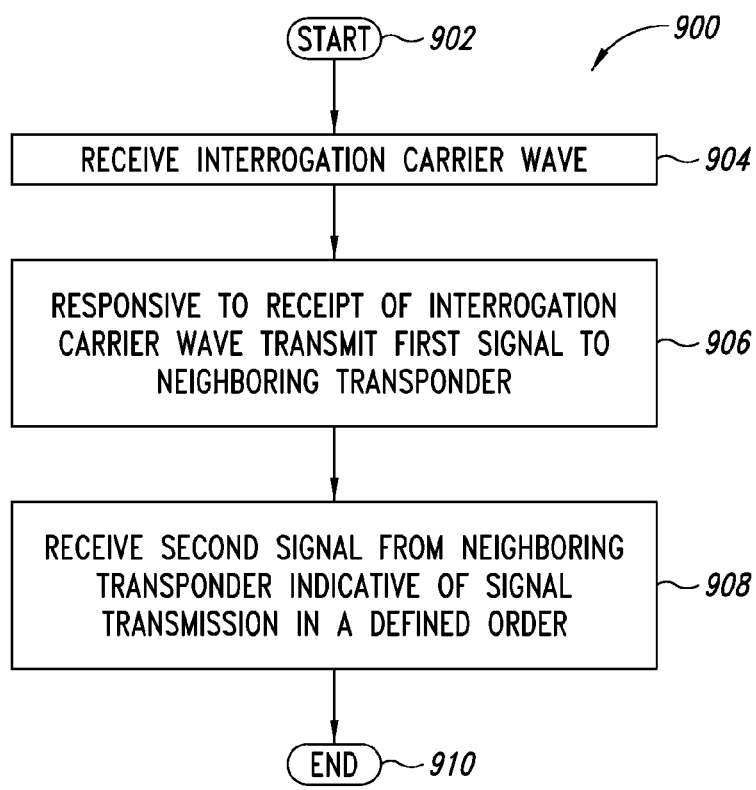
FIG. 9 is a high level logic flow diagram of an illustrative method for passing a defined signal sequentially through a number of neighboring passive wireless transponders, according to one non-limiting illustrated embodiment.

At 808, using the information included in the backscatter wave 102 provided by the first transponder 104, the external host device 110 determines whether each of the passive wireless transponders have successfully transmitted to a respective neighboring passive wireless transponder in a defined order or sequence. In at least some implementations, the external host device can generate one or more human perceptible alarms or annunciations to indicate a failure to transmit in the defined order or sequence. The method of determining interruptions in a known sequence of passive wireless transponders based on the sequential rebroadcast of a backscatter wave from transponder to neighboring transponder in a defined sequence concludes at 810. FIG. 9 shows a high level method 900 of determining by a passive wireless transponder 104 whether the sequential rebroadcast of a backscatter wave by a known sequence or arrangement of transponders has been interrupted. The method of determining by a passive wireless transponder 104 whether the sequential rebroadcast of a backscatter wave by a known sequence or arrangement of transponders has been interrupted commences at 902.

At 904, an interrogation carrier wave 106 is received by a first passive wireless transponder 104*a*. The first passive wireless transponder 104*a* is a member of a plurality of passive wireless transponders 104*a*-104*n* arranged in a defined series, sequence, or configuration.

At 906, responsive to the receipt of the interrogation signal 106, the first passive wireless transponder 104*a* communicates a backscatter wave 102*a* to a neighboring transponder 104*b*, which in turn communicates a backscatter wave 102*b* to a neighboring transponder 104*c*, and so on. A damaged or missing transponder 104 interrupts the sequential transmission of the backscatter wave 102.

At 908, the first passive wireless transponder 104*a* receives a second signal, such as a second backscatter wave 102 generated by a spatially proximate or neighboring passive wireless transponder 104. The second backscatter wave 102 includes data indicative of whether each of a plurality of passive wireless transponders which includes at least the first passive wireless transponder 104*a* and at least the spatially proximate or neighboring passive wireless transponder 104, have successfully transmitted a backscatter wave 102 to one another in a defined order. The method of determining by a passive wireless transponder 104 whether the sequential rebroadcast of a backscatter wave by a known sequence or arrangement of transponders has been interrupted concludes at 910.

Figure 10:
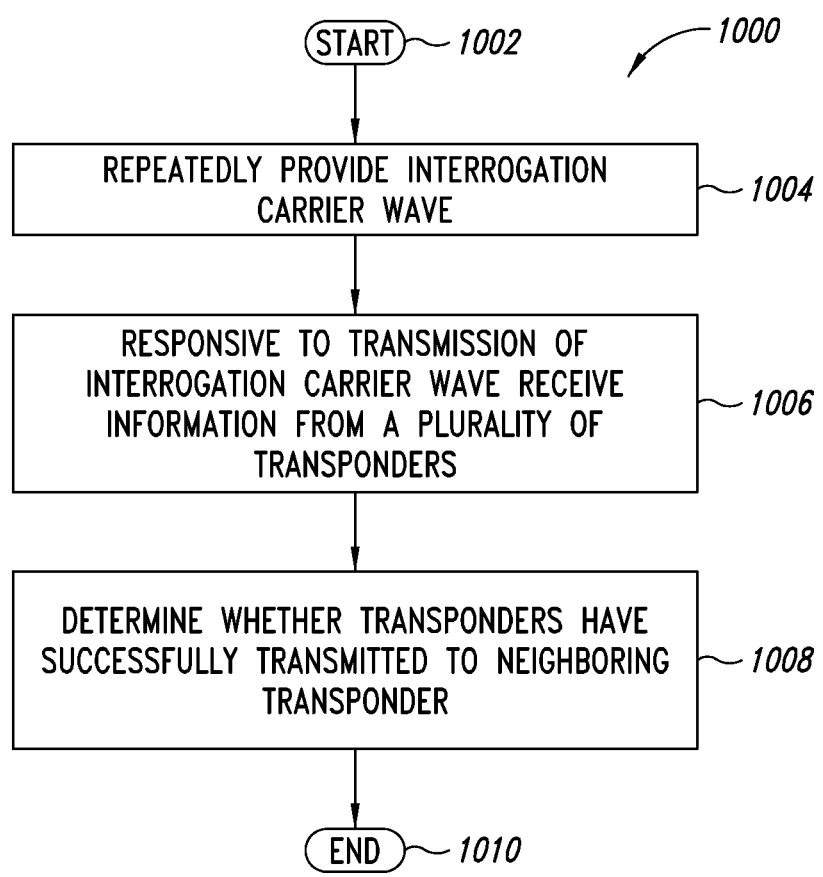
FIG. 10 is a high level logic flow diagram of an illustrative method for determining whether neighboring passive wireless transponders are maintained in a proximate spatial relationship over time, according to one non-limiting illustrated embodiment.

FIG. 10 shows a high level method 1000 of determining the relative positions of a plurality of passive wireless transponders 104*a*-104*n* by repeatedly providing an interrogation carrier wave 106 from a radio frequency generator 110 to the plurality of passive wireless transponders 104*a*-104*n*. In some implementations, passive wireless transponders 104*a*-104*n* may be positioned at defined locations in, on, or about an enclosure 502. Such positioning may provide an indication of undesired access to the interior portion of the enclosure. For example, passive wireless transponders 104*a*-104*n* may be positioned in pairs 510 on an exterior or interior surface proximate an opening (e.g., door, box flaps) providing access to an interior space of an enclosure 502. Upon interrogation, if both passive wireless transponders in each transponder pair 510 indicate placement proximate the other transponder in the transponder pair 510, such indicates the integrity of the enclosure 502 has not be compromised. On the other hand, should one or both of the passive wireless transponders in a transponder pair indicate placement distal from the other transponder in the transponder pair 510, such indicates a potential compromise of enclosure 502 integrity.

An interrogator 206, positioned internal or external to the enclosure 502 may repeatedly provide an interrogation carrier wave 106 to the plurality of passive wireless transponders 104 positioned in, on, or about the enclosure 502. Data indicative of the relative physical position of some or all of the passive wireless transponders (e.g., proximate, distal) may be stored by the interrogator 206 in a communicably coupled nontransitory storage. Date and time data indicative of the date and time the relative physical position of some or all of the passive wireless transponders was obtained may also be stored in the nontransitory storage. Such advantageously provides a history of the relative position of some or all of the plurality of passive wireless transponders. In some instances, the interrogator 206 can transmit one or more signals that include data indicative of the relative physical position of some or all of the passive wireless transponders to one or more remote devices via a communicably coupled communications interface. The method 1000 of determining the relative positions of a plurality of passive wireless transponders 104*a*-104*n* by repeatedly providing an interrogation carrier wave 106 from a radio frequency generator 110 to the plurality of passive wireless transponders 104*a*-104*n* commences at 1002.

At 1004, an interrogator 206 positioned internal or external to the enclosure 502 repeatedly provides at least an interrogation carrier wave to some or all of a plurality of passive wireless transponders 104*a*-104*n* positioned in, on, or about an enclosure 502. In at least some instances, at least a portion of the transponders104*a*-104*n* may be positioned in pairs with each transponder 104 in the pair disposed on opposing surfaces of a movable member 504*a*-504*b* providing access to an interior portion of the enclosure 502. Such positioning permits detection of movement of movable member 504*a*-504*b* which may indicate an attempt to access the interior portion of the enclosure 502. The interrogator may provide such interrogation carrier waves 106 on a periodic, intermittent, or continuous basis.

At 1006, responsive to the receipt of the interrogation carrier wave 106 by some or all of the plurality of passive wireless transponders 104*a*-104*n*, each of the passive wireless transponders 104 generates a backscatter signal 102 to determine the identity of another physically proximate nearest neighbor transponder. If the moveable members 504a, 504b are proximate each other, the identity of the physically proximate nearest neighbor transponder is the other transponder in the pair 510. Some or all of the plurality of passive wireless transponders generate at least one backscatter wave 102 containing information indicative of the identity of the other passive wireless transponder determined to be physically proximate the respective transponder 104 (if any).

At 1008, the interrogator 206 determines whether each of the plurality of passive wireless transponders have successfully transmitted to at least one neighboring passive wireless transponder in response to each interrogation carrier wave 102 received by the plurality of passive wireless transducers 104a-104n. In some instances, the interrogator 206 determines whether each of the plurality of passive wireless transponders 104a-104n have successfully transmitted to at least one neighboring passive wireless transponder.

In other instances, each of the plurality of transponders 104a-104n compares data indicative of the neighboring passive wireless transponder stored in a communicably coupled nontransitory storage with the data indicative of the determined neighboring passive wireless transponder. In such instances, some or all of the passive wireless transponders 104a-104n may communicate information indicative of the comparison results (i.e., MATCH or NO MATCH) to the interrogator 206 via a backscatter wave 102 generated by the respective transducer. The method 1000 of determining the relative positions of a plurality of passive wireless transponders 104a-104n by repeatedly providing an interrogation carrier wave 106 from a radio frequency generator 110 to the plurality of passive wireless transponders 104a-104n concludes at 1010.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to determine the relative positions of a number of passive wireless transponders, the method comprising:

in response to receipt of an interrogation carrier wave output by an RFID reader, receiving information from each of a plurality of passive wireless transponders identifying at least one neighboring passive wireless transponder, wherein the interrogation carrier wave causes the plurality of passive wireless devices to communicate with each other by outputting backscatter waves between at least some of the plurality of passive wireless devices, at least some of the backscatter waves identifying, by a unique identifier, at least one neighboring passive wireless transponder that is spatially proximate the respective passive wireless transponder from which the backscatter is received; and determining a position of the passive wireless transponders relative to one another based at least in part on the information from each of the plurality of passive wireless transponders identifying the at least one neighboring passive wireless transponder.

2. The method of claim 1 wherein receiving information includes receiving information by an interrogator system, and further comprising:

providing the interrogation carrier wave to the plurality of passive wireless transponders which causes at least some of the plurality of passive wireless devices to communicate with one another.

3. The method of claim 2 wherein determining a relative position of the passive wireless transponders with respect to one another based at least in part on the information received from the passive wireless transponders includes determining the relative position of the passive wireless transponders with respect to one another by a host processor-based system, the host processor-based system remotely located with respect to the interrogator system.

4. The method of claim 2 wherein determining a relative position of the passive wireless transponders with respect to one another based at least in part on the information received from the passive wireless transponders includes determining the relative position of the passive wireless transponders with respect to one another by the interrogator system.

5. The method of claim 2 wherein determining a relative position of the passive wireless transponders with respect to one another based at least in part on the information received from the passive wireless transponders includes determining the relative position of the passive wireless transponders with respect to one another by at least one of the passive wireless transponders.

6. The method of claim 2 wherein providing an interrogation carrier wave includes: providing by the interrogator system an interrogation carrier wave having a signal including data modulated thereon.

7. The method of claim 6 wherein providing by the interrogator system an interrogation carrier wave having a signal including data modulated thereon includes:

providing by the interrogator system an interrogation carrier wave having a signal modulated thereon, the signal including data representative of at least one command.

8. The method of claim 1 wherein the plurality of wireless transponders are located about an enclosure, and further comprising:

determining based on the received information whether tampering with the enclosure has occurred; and causing an indication of tampering to be provided in response to a determination that tampering with the enclosure has occurred.

9. The method of claim 1 wherein the plurality of wireless transponders are located about packaging, and further comprising:
determining based on the received information whether tampering with the packaging has occurred; and
causing an indication of tampering to be provided in response to a determination that that tampering with the packaging has occurred.

10. The method of claim 1 wherein the plurality of wireless transponders are located across at least one flap of a packaging, and further comprising:
determining based on the received information whether tampering with the packaging has occurred; and
causing an indication of tampering to be provided in response to a determination that that tampering with the packaging has occurred.

11. The method of claim 1, further comprising:
determining if any of the passive wireless transponders are out of order with respect to in a defined array.

12. The method of claim 1 wherein determining a relative position of the passive wireless transponders with respect to one another based at least in part on the information received from the passive wireless transponders includes generating a virtual map of the plurality of passive wireless transponders, the virtual map which represents relative spatial positions of the passive wireless transponders with respect to one another.

13. An interrogator system to determine the relative positions of a plurality of passive wireless transponders, the interrogator system comprising:
a transceiver to provide an interrogation carrier wave to a plurality of passive wireless transponders which causes the plurality of passive wireless devices to communicate with each other by outputting backscatter waves between at least some of the plurality of passive wireless devices, the backscatter waves identifying at least one neighboring passive wireless transponder that is spatially proximate the respective passive wireless transponder from which the backscatter is received;
a processor communicably coupled to the transceiver; and
a processor-readable nontransitory storage medium including machine executable instructions that when executed by the processor, cause the processor to:
receive information from each of a plurality of passive wireless transponders that identifies at least one neighboring passive wireless transponder that is spatially proximate the respective passive wireless transponder from which the information is received; and
determine a relative position of the passive wireless transponders with respect to one another based at least in part on the information received from the passive wireless transponders.

14. The system of claim 13 wherein the machine executable instructions that cause the processor to receive information from each of a plurality of passive wireless transponders further cause the processor to:
receive information from each of a plurality of passive wireless transponders located about an enclosure;
determine based on the received information whether tampering with the enclosure has occurred; and
responsive to a determination that tampering with the enclosure has occurred, generate a human perceptible output indicative that tampering with the enclosure has occurred.

15. The system of claim 13 wherein the machine executable instructions that cause the processor to receive information from each of a plurality of passive wireless transponders further cause the processor to:
receive information from each of a plurality of passive wireless transponders located about an package;
determine based on the received information whether tampering with the package has occurred; and
responsive to a determination that tampering with the package has occurred, generate a human perceptible output indicative that tampering with the package has occurred.

16. The system of claim 13 wherein the machine executable instructions that cause the processor to receive information from each of a plurality of passive wireless transponders further cause the processor to:
receive information from each of a plurality of passive wireless transponders located across at least one packaging flap;
determine based on the received information whether tampering with the package has occurred; and
responsive to a determination that tampering with the package has occurred, generate a human perceptible output indicative that tampering with the package has occurred.

17. The system of claim 13 wherein the machine executable instructions further cause the processor to:
compare information received information from each of a plurality of passive wireless transponders with stored data indicative of a defined array; and
determine whether any of the passive wireless transponders are out of order with respect to the defined array.

18. The system of claim 13 wherein the machine executable instructions further cause the processor to:
generate a virtual map of the plurality of passive wireless transponders, the virtual map representative of the relative spatial positions of the passive wireless transponders with respect to each other.

19. A method of operation of a passive wireless transponder, the method comprising:
in response to receipt of an interrogation carrier wave, receiving information from each of a number of other passive wireless transponders by the passive wireless transponder, wherein the interrogation carrier wave causes passive wireless devices receiving the interrogation carrier wave to communicate with each other by outputting backscatter waves between at least some of the passive wireless devices, the backscatter waves identifying at least one neighboring passive wireless transponder that is spatially proximate the respective passive wireless transponder from which the backscatter is received; and
transmitting information identifying at least one of the other passive wireless transponders as a neighboring passive wireless transponder that is spatially proximate the passive wireless transponder from which the information is received.

20. The method of claim 19, further comprising:
categorizing at least one of the other passive wireless transponders as a neighboring passive wireless transponder.

21. The method of claim 20 wherein categorizing at least one of the other passive wireless transponders as a neighboring passive wireless transponder includes categorizing at least one of the other passive wireless transponders as a neighboring passive wireless transponder based at least in part on a signal strength of a signal received by the passive wireless transponder from one of the other passive wireless transponders.

22. The method of claim 20 wherein categorizing at least one of the other passive wireless transponders as a neighboring passive wireless transponder includes categorizing at least one of the other passive wireless transponders as a neighboring passive wireless transponder based at least in part on a signal strength of a signal received by the passive wireless transponder from one of the other passive wireless transponders relative to a signal strength of a signal received by the passive wireless transponder from other ones of the other passive wireless transponders.

23. The method of claim 20 wherein categorizing at least one of the other passive wireless transponders as a neighboring passive wireless transponder includes categorizing at least one of the other passive wireless transponders as a neighboring passive wireless transponder based at least in part on a time-of-flight of a signal received by the passive wireless transponder from one of the other passive wireless transponders.

24. The method of claim 20 wherein categorizing at least one of the other passive wireless transponders as a neighboring passive wireless transponder includes categorizing at least one of the other passive wireless transponders as a neighboring passive wireless transponder based at least in part on a time-of-flight of a signal received by the passive wireless transponder from one of the other passive wireless transponders relative to a time-of-flight of a signal received by the passive wireless transponder from other ones of the other passive wireless transponders.

25. The method of claim 20 wherein transmitting information identifying at least one of the other passive wireless transponders as a neighboring passive wireless transponder includes backscattering an interrogation carrier wave received from an interrogator system with the information encoded in the backscattered signal.

26. A passive wireless transponder, comprising:
an antenna;
a controller communicably coupled to the antenna; and
a nontransitory storage media communicably coupled to the controller including machine-executable instructions that cause the controller to:
receive information from backscatter waves from at least one of other passive wireless transponders, the backscatter waves generated by the other wireless transponder receiving an interrogation carrier wave by the antenna, the information comprising a unique identifier identifying a spatially proximate, neighboring, passive wireless transponder; and
transmit information that identifies at least one of the other passive wireless transponders as the spatially proximate, neighboring, passive wireless transponder.

27. The transponder of claim 26 wherein the machine-executable instructions that cause the controller to transmit information that identifies at least one of the other passive wireless transponders as a spatially proximate, neighboring, passive wireless transponder further cause the controller to:
identify at least one of the other passive wireless transponders as a spatially proximate, neighboring, passive wireless transponder based on a received signal strength representative of a signal received from each of the other passive wireless transponders; and
transmit information that identifies at least one of the other passive wireless transponders as a spatially proximate, neighboring, passive wireless transponder.

28. The transponder of claim 26 wherein the machine-executable instructions that cause the controller to transmit information that identifies at least one of the other passive wireless transponders as a spatially proximate, neighboring, passive wireless transponder further cause the controller to:
compare a signal strength representative of a signal received from one of the other passive wireless transponders with signal strengths of signals received from other ones of the other passive wireless transponders;
identify at least one of the other passive wireless transponders as a spatially proximate, neighboring, passive wireless transponder based on the compared signal strengths; and
transmit information that identifies at least one of the other passive wireless transponders as a spatially proximate, neighboring, passive wireless transponder.

29. The transponder of claim 26 wherein the machine-executable instructions that cause the controller to transmit information that identifies at least one of the other passive wireless transponders as a spatially proximate, neighboring, passive wireless transponder further cause the controller to:
identify at least one of the other passive wireless transponders as a spatially proximate, neighboring, passive wireless transponder based on a time-of-flight parameter of a signal received from each of the other passive wireless transponders; and
transmit information that identifies at least one of the other passive wireless transponders as a spatially proximate, neighboring, passive wireless transponder.

30. The transponder of claim 26 wherein the machine-executable instructions that cause the controller to transmit information that identifies at least one of the other passive wireless transponders as a spatially proximate, neighboring, passive wireless transponder further cause the controller to:
compare a time-of-flight parameter of a signal received from one of the other passive wireless transponders with time-of-flight parameters of signals received from other ones of the other passive wireless transponders;
identify at least one of the other passive wireless transponders as a spatially proximate, neighboring, passive wireless transponder based on the compared times-of-flight; and
transmit information that identifies at least one of the other passive wireless transponders as a spatially proximate, neighboring, passive wireless transponder.

\* \* \* \* \*